(12) United States Patent
Joubert et al.

(10) Patent No.: US 6,417,300 B1
(45) Date of Patent: Jul. 9, 2002

(54) TERPOLYMERIZATION

(75) Inventors: Dawid Johannes Joubert, Sasolburg; Ignatius Hendrik Potgieter, Vanderbijlpark; Ioan Tincul, Sasolburg, all of (ZA)

(73) Assignee: Sasol Technology Proprietary Limited, Johannesburg (ZA)

( * ) Notice: Subject to any disclaimer, the term of this patent is extended or adjusted under 35 U.S.C. 154(b) by 0 days.

(21) Appl. No.: 09/194,672

(22) PCT Filed: Jun. 2, 1997

(86) PCT No.: PCT/GB97/01479

§ 371 (c)(1),
(2), (4) Date: May 12, 1999

(87) PCT Pub. No.: WO97/45454

PCT Pub. Date: Dec. 4, 1997

(30) Foreign Application Priority Data

| May 31, 1996 | (GB) | PCT/GB96/01294 |
| Nov. 8, 1996 | (ZA) | 96/9415 |
| Nov. 27, 1996 | (ZA) | 96/9965 |

(51) Int. Cl.⁷ ............ C08F 10/14; C08F 2/06; C08F 4/44
(52) U.S. Cl. ............ 526/124.3; 526/125.6; 526/201; 526/160; 526/348.4; 526/348.5; 526/348.6; 526/65; 526/916
(58) Field of Search ............ 526/348.4, 348.5, 526/348.6, 160, 916, 124.3, 125.6, 201

(56) References Cited

U.S. PATENT DOCUMENTS

| 4,304,890 A | * | 12/1981 | Suzuki et al. ............ 526/87 |
| 4,483,971 A | * | 11/1984 | Sato et al. ............ 526/142 |
| 5,350,532 A | * | 9/1994 | Song et al. ............ 252/49.6 |
| 6,191,246 B1 | * | 2/2001 | Joubert et al. ............ 526/348.5 |

FOREIGN PATENT DOCUMENTS

| EP | 0038119 | 10/1981 |
| EP | 0143002 | 5/1985 |
| EP | 0281524 | 9/1988 |
| EP | 0492788 | 7/1992 |
| EP | 0522651 | 1/1993 |
| EP | 0544340 | 6/1993 |
| EP | 0570199 | 11/1993 |
| JP | 1240538 | 9/1989 |
| WO | 9638485 | 12/1996 |

OTHER PUBLICATIONS

Chemical Abstracts, vol. 112, No. 24 (Jun. 11, 1990) (No. 218115) (XP002038219) of JP 1240538 of Sep. 26, 1989.

* cited by examiner

Primary Examiner—David W. Wu
Assistant Examiner—R. Rabago
(74) Attorney, Agent, or Firm—Ladas & Parry

(57) ABSTRACT

Disclosed are terpolymers and processes of terpolymerization, wherein the terpolymer comprises units derived from ethylene, 1-pentene and another alpha-olefin containing at least six carbon atoms.

18 Claims, No Drawings

TERPOLYMERIZATION

This invention relates to terpolymerization. It relates in particular to terpolymers of ethylene, 1-pentene and a third alpha olefin, to a process for producing such terpolymers, and to a method of preparation of a prepolymer.

According to a first aspect of the invention, there is provided a terpolymer of ethylene, 1-pentene and a further alpha olefin ("α-olefin") which differs as regards its total number of carbon atoms, by more than 1 unit from 1-pentene.

In other words, according to the first aspect of the invention, there is provided a terpolymer which comprises a polymerization product obtained by polymerizing at least ethylene, 1-pentene and a further alpha olefin ("α-olefin") which differs as regards its total number of carbon atoms, by more than 1 unit from 1-pentene.

The Inventors have discovered that known art relating to the copolymerization of ethylene with different alpha olefins, and known art relating to the terpolymerization of ethylene with alpha olefins cannot be applied directly to the terpolymerization of ethylene with 1-pentene and a third alpha olefin. On the contrary, in the terpolymerization of ethylene with 1-pentene and the further α-olefin according to the invention, surprising application terpolymers can be obtained with unexpected domains of fundamental properties. It is known from the art that polymers of ethylene, in the same domain of density, exhibit appropriate application properties derived from the density, with known correction mainly due to differences in the melt flow index and the index of polydispersity. The Inventors have, however, surprisingly found that terpolymers of ethylene with 1-pentene and a further or third alpha olefin according to this invention may have the same domain of density and while in the same domain of melt flow index and/or domain of polydispersity may, however, have very different and surprising application properties.

The Inventors have even more surprisingly discovered that within the family of. the terpolymers of ethylene with 1-pentene and a third alpha olefin according to this invention, particular families with even more surprising application properties can be obtained. Thus, a terpolymer of ethylene with 1-pentene and a further α-olefin as hereinbefore described can have unexpectedly different properties when compared with a terpolymer of ethylene with one pentene and a further α-olefin differing, as regards its total number of carbon atoms, from 1-pentene and having fewer carbon atoms than 1-pentene.

The properties of the terpolymer of the invention are determined mainly by the ratio or proportion of ethylene to the combination of 1-pentene and the further α-olefin in the terpolymer, and by the ratio or proportion of 1-pentene to the further α-olefin. In other words, the properties of the terpolymer, based on the ethylene: the sum of the total comonomer content, on a molar basis, can be altered by varying the molar ratio of the 1-pentene: further α-olefin. In this manner, a large number of particular terpolymers can be obtained with large range of application properties controlled between certain limits. Typical applications of the terpolymer include extrusions, blow moulding and injection moulding.

The ratio of the molar proportion of ethylene to the sum of the molar proportions of 1-pentene and the further α-olefin may be between 99,9:0,1 and 90:10.

The ratio of the molar proportion of 1-pentene to that of the further α-olefin may be between 0,01:99,99 and 99,99:0,01. The preferred third α-olefin content of the terpolymer, based on the 1-pentene content thereof, is greater than 10% by mass and, most preferably, greater than 20% by mass.

The third alpha olefin may be any alpha olefin having a total number of carbon atoms greater than 6 and less than 10 except alpha olefins with a branch directly linked to the double bond. Preferred are linear alpha olefins. The most preferred are alpha olefins with a total number of carbon atoms equal to or less than 8.

The Inventors have surprisingly discovered that terpolymers of ethylene, 1-pentene and a further α-olefin wherein the number of carbon atoms of the third alpha olefin differs 3 units or less from 1-pentene often have superior application properties and a better balance of properties to those where the number of carbon atom differs by more than 3 units from 1-pentene.

In particular, the further alpha olefin may be 1-octene. The terpolymer of this aspect of the invention will thus be a terpolymer of ethylene, 1-pentene and 1-octene.

The terpolymer of ethylene, 1-pentene and 1-octene may have the following properties:
(a) A melt flow rate, as measured according to ASTM D 1238, in the range of about 0,01 to about 100 g/10 min; and/or
(b) A density as measured according to ASTM D 1505, in the range 0,890 to about 0,950.

In an even more particular case, this terpolymer may be such that when it is bottom blown into a film having a thickness of 30μ, the film complies with the following requisites:
(i) An impact strength, as measured according to ASTM D 1709, of greater than 60 g: and/or
(ii) A tear strength, as measured according to ASTM 1922, of greater than 2,3 g/μm in the machine direction (MD) and greater than 11 g/μm in the transverse direction (TD).

In another particular case, the terpolymer of ethylene, 1-pentene and 1-octene may be such that when injection moulded according to ASTM D 647, it has the following properties:
(a) A melt flow rate, as measured according to ASTM D 1238, in the range of about 0,01 to about 100 g/10 min; and/or
(b) A density as measured according to ASTM D 1505, in the range 0,890 to about 0,950;
(c) an Izod notched impact strength, as measured according to ASTM D 256, of between 5 and 50 kJ/m$^2$;
(d) a tensile strength at yield, as measured according to ASTM D 256 M, of between 7,5 and 15 MPa; and
(e) a modulus, as measured according to ASTM D 256 M, of between 150 and 600 MPa.

According to a second aspect of the invention, there is provided a terpolymer of ethylene, 1-pentene and a further alpha olefin ("α-olefin") which, as regards its total number of carbon atoms, differs by 1 unit from 1-pentene and has more carbon atoms than 1-pentene, and which, when injection moulded according to ASTM D 647, complies with the following requisites:
(a) a melt flow rate, as measured according to ASTM D 1238, in the range of about 0,01 to about 100 g/10 min; and/or
(b) a density as measured according to ASTM D 1505, in the range 0,890 to about 0,950;
(c) an Izod notched impact strength, as measured according to ASTM D 256, of between 5 and 65 kJ/m$^2$;
(d) a tensile strength at yield, as measured according to ASTM D 256 M, of between 9 and 25 MPa; and (e) a modulus, as measured according to ASTM D 256 M, of between than 200 and 1000 MPa.

In other words, according to the second aspect of the invention, there is provided a terpolymer which comprises a polymerization product obtained by polymerizing at least ethylene, 1-pentene and a further alpha olefin ("α-olefin") which, as regards its total number of carbon atoms, differs by 1 unit from 1-pentene and has more carbon atoms than 1-pentene, and which, when injection moulded according to ASTM D 647, complies with the following requisites:

(a) a melt flow rate, as measured according to ASTM D 1238, in the range of about 0,01 to about 100 g/10 min; and/or (b) a density as measured according to ASTM D 1505, in the range 0,890 to about 0,950;

(c) an Izod notched impact strength, as measured according to ASTM D 256, of between 5 and 65 kJ/m$^2$;

(d) a tensile strength at yield, as measured according to ASTM D 256 M, of between 9 and 25 MPa; and (e) a modulus, as measured according to ASTM D 256 M, of between than 200 and 1000 MPa.

This alpha olefin may thus be 1-hexene. The terpolymer of this aspect of the invention is thus a terpolymer of ethylene, 1-pentene and 1-hexene.

This terpolymer may also be such that when it is bottom blown into a film having a thickness of 30μ, the film complies with the following requisites:

(i) An impact strength, as measured according to ASTM D 1709, of greater than 60 g; and/or (ii) a tensile strength at yield, as measured according to ASTM D 882 higher than 7 MPa in the machine direction (MD) higher than 8 MPa in the transverse direction.

According to a third aspect of the invention, there is provided a terpolymer of ethylene, 1-pentene and a further alpha olefin ("α-olefins") which, as regards its total number of carbon atoms, differs by 1 unit from 1-pentene and has fewer carbon atoms than 1-pentene.

In other words, according to the second aspect of the invention, there is provided a terpolymer which comprises a polymerization product obtained by polymerizing at least ethylene, 1-pentene and a further alpha olefin ("α-olefin") which, as regards its total number of carbon atoms, differs by 1 unit from 1-pentene and has fewer carbon atoms than 1-pentene.

The properties of the terpolymer according to the third aspect of the invention are determined mainly by the ratio or proportion of ethylene to the combination of 1-pentene and the further α-olefin in the terpolymer, and by the ratio or proportion of 1-pentene to the further α-olefin. In other words, the properties of the terpolymer based on the ethylene: the sum of the total comonomer content, on a molar basis, can be altered by varying the molar ratio of 1-pentene: further α-olefin. In this manner a large number of particular terpolymers can be obtained with a large range of application properties controlled between certain limits.

As before, the ratio of the molar proportion of ethylene to the sum of the molar proportions of 1-pentene and the further α-olefin may be between 99,9:0,1 and 90:10.

The ratio of the molar proportion of 1-pentene to that of the further α-olefin may be between 0,01:99,99 and 99,99:0,01. The preferred third α-olefin content of the terpolymer, based on the 1-pentene content thereof, is greater than 10% by mass and, most preferably, greater than 20% by mass.

The further α-olefin thus, in the third aspect of the invention, is 1-butene. Thus, the terpolymer of the third aspect of the invention is a terpolymer of ethylene, 1-pentene and 1-butene.

In particular the terpolymer of ethylene, 1-pentene and 1-butene may have the following properties:

(a) A melt flow rate, as measured according to ASTM D 1238, in the range of about 0,01 to about 100 g/10 min; and/or (b) A density, as measured according to ASTM D 1505, in the range 0,890 to about 0,950.

More particularly, this terpolymer may be such that, when it is bottom blown into a film having a thickness of 30μ, the film complies with the following requisites:

(i) A tensile strength at break, as measured according to ASTM D 882, of greater than 25 MPa in the machine direction (MD) and greater than 20 MPa in the transverse direction (TD); and/or (ii) A tensile strength at yield, as measured according to ASTM D 882, of greater than 12 MPa in the machine direction (MD) and greater than 11 MPa in the transverse direction (TD).

In another particular case the terpolymer of ethylene, 1-pentene and 1-butene may be such that, when injection moulded according to ASTM D 647, it complies with the following properties:

(a) A melt flow rate, as measured according to ASTM D 1238, in the range of about 0,01 to about 100 g/10 min; and/or (b) A density as measured according to ASTM D 1505, in the range 0,890 to about 0,950.

(c) an Izod notched impact strength, as measured according to ASTM D 256, of between 5 and 40 kJ/m$^2$.

(d) a tensile strength at yield, as measured according to ASTM D 256 M, of between 5 and 20 MPa (e) a modulus as measured according to ASTM D 256 M, of between 100 and 500 MPa.

In particular, the terpolymers according to the first, second and third aspects of the invention may be those obtained by reacting ethylene, 1-pentene and the further α-olefin in one or more reaction zones, while maintaining in the reaction zone(s) a pressure in the range between atmospheric pressure and 200 kg/cm$^2$ and a temperature between ambient and 300° C., in the presence of a suitable catalyst or catalyst system, particularly a Ziegler-Natta catalyst or catalyst system.

The Inventors have also found out that in the terpolymerization of ethylene with 1-pentene and a further alpha olefin, even more particular terpolymers are obtained when different particular processes are employed to produce terpolymers of ethylene with 1-pentene and the further alpha olefin.

Thus, according to a fourth aspect of the invention, there is provided a process for producing a terpolymer, which process comprises reacting a reaction mixture comprising ethylene, 1-pentene and a further α-olefin which differs, as regards its total number of carbon atoms, by more than 1 unit from 1-pentene in one or more reaction zones, while maintaining the reaction zone(s) at a pressure between atmospheric pressure and 200 kg/cm$^2$, and at a temperature between ambient and 300° C., in the presence of a catalyst or a catalyst system comprising a catalyst and a cocatalyst, with the reaction being effected in a slurry phase, a gas phase or a solution phase.

Also, according to a fifth aspect of the invention, there is provided a process for producing a terpolymer, which process comprises reacting a reaction mixture comprising ethylene, 1-pentene, and a further α-olefin which, as regards its total number of carbon atoms, differs by 1 unit from 1-pentene and has fewer carbon atoms than 1-pentene, in one or more reaction zones, while maintaining the reaction zone(s) at a pressure between atmospheric pressure and 200 kg/cm², and at a temperature between ambient and 300° C., in the presence of a catalyst or a catalyst system comprising a catalyst and a cocatalyst, with the reaction being effected in a slurry phase, a gas phase or a solution phase.

Further, according to a sixth aspect of the invention, there is provided a process for producing a terpolymer, which process comprises reacting a reaction mixture comprising a ethylene, 1-pentene, and a further α-olefin which, as regards its total number of carbon atoms, differs by 1 unit from 1-pentene and has more carbon atoms than 1-pentene, in one or more reaction zones, while maintaining the reaction zone(s) at a pressure between atmospheric pressure and 200 kg/cm², and at a temperature between ambient and 300° C., in the presence of a catalyst or a catalyst system comprising a catalyst and a cocatalyst, with the reaction being effected in a gas phase or a solution phase.

The reaction is thus carried out in one or more reaction zones, which may be provided in a single stage reactor vessel or by a chain of two or more reaction vessels.

The reaction can be effected in a batch fashion, with the 1-pentene and the further α-olefin being added simultaneously at the start of the reaction while the ethylene is added continuously during the course of the reaction, with no product being removed during the reaction. Instead, the reaction can be effected in a batch fashion, with the 1-pentene and the further α-olefin being added simultaneously with the ethylene and continuously or discontinuously during the course of the reaction, with no product being removed during the reaction. Instead, the reaction can be effected in a batch fashion, with either 1-pentene or the further α-olefin being added at the start of the reaction while ethylene is added continuously during the reaction and a continuous or discontinuous supply of the monomer which was not added at the beginning of the reaction is provided, with no product being removed during the reaction.

The reaction can, however, instead be effected in a continuous fashion, with the ethylene being added continuously and the 1-pentene and the further α-olefin being added together or separately, continuously or discontinuously, during the course of the reaction, and the terpolymer product continuously being withdrawn from the reaction zone.

Terpolymers obtained from the process by using a particular feed composition and under particular reaction conditions have a random distribution which is determined mainly by the different reactivities of the monomers. This provide once more a unique tool for obtaining a large variety of ethylene, 1-pentene and further α-olefin terpolymers whose properties are mainly controlled by their composition and non-uniformity.

The molecular weight of the resultant random terpolymer can be regulated by hydrogen addition to the reaction zone during the reaction. The greater the amount of hydrogen added, the lower will be the molecular weight of the random terpolymer.

The terpolymerization is preferably performed in a substantially oxygen and water free state, and in the presence or absence of an inert saturated hydrocarbon The terpolymerization reaction according to the fourth and fifth aspects of the invention may thus be carried out in slurry phase, solution phase or vapour phase, with slurry phase polymerization being preferred.

Thus, in one embodiment of the fourth and fifth aspects of the invention, a slurry polymerization process is used. The further α-olefin may then, in particular, be 1-octene or 1-butene.

When slurry phase polymerization is used, the catalyst will thus be in solid particulate form, and preferably comprises a Ziegler-Natta catalyst. Thus, the ethylene, 1-pentene and the further α-olefin will be polymerized in a suspension state in the presence of the Ziegler-Natta catalyst in solid particulate form and which is suspended in a slurrying or suspension agent.

The Ziegler-Natta catalyst may be that obtained by contacting magnesium chloride with titanium tetrachloride in the presence of a plurality of alcohols.

Thus, the magnesium chloride is the support of the catalyst. The magnesium chloride may be used in the form of anhydrous or partially anhydrized magnesium chloride providing that the anhydrization is effected in such a manner that no anhydrization agent remains in the anhydrized magnesium chloride which is further used to prepare the catalyst. The magnesium chloride may have a water content of between 0,02 mole of water/1 mole of magnesium chloride and 2 mole of water/1 mole of magnesium chloride. More preferably, the water content of the magnesium chloride may, in one. particular case, be 1,5% by mass, and in a second particular case, may be 5% by mass.

The anhydrous or partially anhydrized magnesium chloride is preferably activated prior to contacting or loading it with the titanium tetrachloride.

The activation of the anhydrous or partially anhydrized magnesium chloride may be performed under inert conditions, ie in a substantially oxygen and water free atmosphere, and in the absence or presence of an inert saturated hydrocarbon carrier liquid. Preferred inert saturated hydrocarbon carrier liquids, when present, are aliphatic or cyclo-aliphatic liquid hydrocarbons, such as hexane and heptane.

The magnesium chloride or support activation may be performed in two steps $(a_1)$ and $(a_2)$.

In step $(a_1)$, an ether may be added under inert conditions to a suspension of the magnesium chloride in the inert hydrocarbon carrier liquid or to the magnesium chloride in powder form. The ether may be selected from linear ethers having a total number of carbon atoms between 8 and 16. The most preferred ethers are: di-butyl ether and di-pentyl ether. The molar ratio of the magnesium chloride to the ether may be between 0,3:1 and 3:1, with the preferred molar ratio being 1:1 to 2,5:1. The resultant mixture or suspension may be stirred for a period of 10 minutes to 24 hours at room temperature. The preferred stirring time is 1 to 12 hours. The preferred temperature for mixing the ether with the magnesium chloride to prepare the partially activated magnesium chloride is 40° C. to 140° C.

In the second step $(a_2)$ an alkyl aluminium compound may be added, preferably in dropwise fashion, to the partially activated magnesium chloride. Typical alkyl aluminium compounds which can be used are those expressed by the formula $AlR_3$ wherein R is an alkyl radical or radical component having 1 to 10 carbon atoms. Specific examples of suitable alkyl aluminium compounds which can be used are: tri-butyl aluminium, tri-isobutyl aluminium, tri-hexyl aluminium and tri-octyl aluminium. The most preferred organo-aluminium compounds is triethyl aluminium. The molar ratio of the alkyl aluminium compound to the anhydrous magnesium chloride may be between 1:1 and 6:1. The preferred molar ratio of the alkyl aluminium compound to the anhydrous magnesium chloride is 4:1 to 5:1. The proportions of the alkyl-aluminium compound and partially activated magnesium chloride used may be such that formula (1) is complied with:

$$A > B + C + D \quad (1)$$

where

A represents the total moles of the alkyl aluminium compound;

B represents the total moles of magnesium chloride used;

C represents the total moles of ether used; and

D represents the total moles of water present, being the sum of the water of hydration associated with the magnesium chloride and any traces of water in the carrier liquid.

The loading of the activated magnesium chloride or support with the titanium tetrachloride may be performed in two steps ($b_1$) and ($b_2$).

In the first step ($b_1$), to the support, after thorough washing thereof with hexane, is added the plurality of alcohols under stirring. The alcohols may be added separately. However, they are preferably added as a multicomponent mixture. Each alcohol may be selected from the range of alcohols having 2 to 8 carbon atoms. A dicomponent alcohol mixture or a three component alcohol mixture can thus be used. A three component mixture of alcohols is preferred. The most preferred method is to select, in a tricomponent alcohol mixture, the three alcohols having the same number of carbon atoms as three monomers used in the process of producing a terpolymer wherein the catalyst, the product of this catalyst preparation, is used. Examples of preferred alcohol mixtures for use in the catalyst preparation are: a mixture of ethanol, butanol and pentanol; a mixture of ethanol, hexanol and pentanol; or a mixture of ethanol, octanol and pentanol.

The molar ratio of the alcohol mixture to the initial magnesium chloride used may be between 0,4:1 and 4:1. However the preferred molar ratio of the alcohol mixture to the initial magnesium chloride is 0,8:1 to 2,5:1.

The molar ratio between the two alcohols in a dicomponent mixture can be 100:1 to 1:100; however, the preferred molar ratio between the two alcohols is 1:1.

The molar ratio between the three alcohols in a three component alcohol mixture can vary widely, but preferably is about 1:1:1.

The stirring time may be between 1 min and 10 hours, preferably about 3 hours.

The temperature range can be between 0° C. and the lower of the boiling point of the any one of the alcohols of the multicomponent alcohol mixture or the solvent used in this step of the catalyst preparation.

In one embodiment, the amounts of the alcohols used in this step may be such that formula (2) is complied with:

$$[A] < [Al] \quad (2)$$

where [A] represents the total moles of alcohol added and [Al] is the measured moles of aluminium present in the activated magnesium chloride-containing slurry.

In another embodiment, the amounts of the alcohols used in this step may be such that formula (3) is complied with:

$$[A] < 2[Al]/3 \quad (3)$$

where [A] and [Al] are as hereinbefore defined.

In yet another embodiment, the amounts of the alcohols used in this step may be such that formula (4) is complied with:

$$[A] < [Al]/3 \quad (4)$$

where [A] and [Al] are as hereinbefore defined.

In the second step ($b_2$), $TiCl_4$ may be added to the support/alcohol mixture, the mixture or slurry stirred under reflux and finally left to cool, eg for about 24 hours. The catalyst obtained may be thoroughly washed, eg with hexane.

The molar ratio of $TiCl_4$ employed in this step to the initial magnesium chloride may be from about 2:1 to about 20:1, preferably about 10:1.

The co-catalyst, when present, may be, or comprise, an organo aluminium compound. Typical organo-aluminium compounds which can be used are compounds expressed by the formula $AlR_mX_{3-m}$ wherein R is a hydrocarbon component of 1 to 15 carbon atoms, X is a halogen atom, and m is a number represented by $0 < m \leq 3$. Specific examples of suitable organo aluminium compounds which can be used are: a trialkyl aluminium, a trialkenyl aluminium, a partially halogenated alkyl aluminium, an alkyl aluminium sesquihalide, an alkyl aluminium dihalide. Preferred organo aluminium compounds are alkyl aluminium compounds, and the most preferred is triethylaluminium. The atomic ratio of aluminium to titanium in the catalyst system may be between 0,1:1 and 10000:1, preferably between 1:1 and 5000:1.

Preferred slurrying or suspension agents are aliphatic or cyclo-aliphatic liquid hydrocarbons, with the most preferred being hexane and heptane.

The Inventors have surprisingly found that the particular way in which the catalyst complex is supplied to the reaction zone when using the catalyst as hereinbefore prepared strongly affects the catalyst performance in particular aspects of the process according to this invention.

Particular aspects of the process according to this invention are distinguished by whether the activation step of the catalyst with the cocatalyst to obtain the catalyst system is performed directly in the reaction zone or in a separate activation unit.

Particular aspects of the process according to this invention are distinguished by whether the catalyst system is supplied to the reaction zone at "the optimum ageing time", or at "constant activity" time.

The Inventors have found that a particular catalyst prepared according to the method described above and designed for a particular process of terpolymerization of ethylene with 1-pentene, and 1-butene or 1-octene, or for a process for the terpolymerization of ethylene with 1-pentene and another alpha olefin and even more generally for homopolymerization, copolymerization, terpolymerization or multiple polymerization of olefins, exhibit particular activation/deactivation kinetics when put in contact with the cocatalyst, the organo-aluminium compound.

More particularly, the catalyst prepared according to the method as hereinbefore described, may reach the highest activity in the polymerization of the olefins or monomers, and even more particularly in the terpolymerization of ethylene with 1-pentene, and 1-butene or 1-octene or in the terpolymerization of ethylene with 1-pentene and another alpha olefin, after a particular time elapsed from the moment the catalyst is put in contact with the cocatalyst.

For each particularly prepared catalyst "the optimum ageing time", $^xOAT^y$, is defined as the time, expressed in minutes, which has elapsed from the moment the catalyst and the cocatalyst are put in contact with each other, until they reach maximum activity for the polymerization of a specific monomer or monomers, y, at a specific temperature, x, indicated in 0° C., in a standard slurry batch polymerization performed in polymerization grade n-heptane at a total constant pressure of 15 kg/cm$^2$ with a partial pressure of hydrogen of 2 kg/cm$_2$. The term, y, can be a monomer or a mixture of two, three or more monomers or olefins represented by the letter C followed by a number representing the total number of carbon atoms of the alpha olefin employed. When more than one monomer is used, such as in the case of co-, ter- or multiple polymerization, then, for each monomer or α-olefin used, the letter C combined with the number representing the total carbon atoms of that alpha olefin is used, with these designations being connected by the sign +, with two of them representing the particular copolymerization and with three of them representing the particular terpolymerization.

Thus $^{50}OAT^{C2+C4+C5}$ represents an OAT for a temperature of 50° C. and a mixture of ethylene, butene-1 and pentene-1.

However, for practical reasons, a standard measurement of OAT for ethylene at 80° C. may be used.

For each particularly prepared catalyst "constant activity time ""CAT"", is defined as the time, expressed in minutes, which has elapsed from the moment the catalyst and the cocatalyst are put in contact with each other until they reach a constant activity for the polymerization of a specific monomer or monomers, y, at a specific temperature, X, indicated in ° C., in a standard slurry batch polymerization performed in polymerization grade n-heptane at a total constant pressure of 15 kg/cm$^2$ with a partial pressure of hydrogen of 2 kg/cm$^2$. The term, y, can be a monomer or a mixture of two, three or more monomers or olefins represented by the letter C followed by a number representing the total number of carbon atoms of the alpha olefin employed. When more than one monomer is used, such as in the case of co-, ter- or multiple polymerization, then, for each monomer or α-olefin used, the letter C combined with the number representing the total carbon atoms of that alpha olefin is used, with these designations being connected by the sign +, with two of them representing the particular copolymerization and with three of them representing the particular terpolymerization.

Thus $^{50}CAT^{C2+C4+C5}$ represents a CAT for a temperature of 50° C. and a mixture of ethylene, butene-1 and pentene-1.

However, for practical reasons, a standard measurement of CAT for ethylene at 80° C. may be used.

For each particularly prepared catalyst "Limit activity time, ""LAT"", is defined as the time, expressed in minutes, which has elapsed from the moment the catalyst and the cocatalyst are put in contact with each other until they reach an activity lower than a productivity of 10000 g of polymer/g of catalyst/hour, for the polymerization of a specific monomer or monomers, y, at a specific temperature, x, indicated in ° C., in a standard slurry batch polymerization performed in polymerization grade n-heptane at a total constant pressure of 15 kg/cm$^2$ with a partial pressure of hydrogen of 2 kg/cm$^2$. The term, y, can be a monomer or a mixture of two, three or more monomers or olefins represented by the letter C followed by a number representing the total number of carbon atoms of the alpha olefin employed. When more than one monomer is used, such as in the case of co-, ter- or multiple polymerization, then, for each monomer or α-olefin used, the letter, C, combined with the number representing the total carbon atoms of that alpha olefin is used, with these designations being connected by the sign +, with two of them representing the particular copolymerization and with three of them representing the particular terpolymerization.

Thus $^{50L}LAT^{C2+C4+C5}$ represents an LAT for a temperature of 50° C. and a mixture of ethylene, butene-1 and pentene-1.

However, for practical reasons, a standard measurement of LAT for ethylene at 80° C. may be used.

Thus, in a particular case of the slurry phase polymerization, the cocatalyst may first be supplied to the reaction zone, and the catalyst then supplied thereto after a time interval. In another particular case, the cocatalyst and the catalyst may be supplied simultaneously to the reaction zone. In both these cases, the residence time of the reaction mixture may preferentially be selected to be less than LAT.

In still another case of this aspect of the invention the catalyst system, after being prepared separately in an activation zone or unit, is supplied to the reaction zone at OAT. In these cases, the sum of the residence time of the catalyst in the activation unit and the residence time of the catalyst in the reaction zone, may preferentially be selected to be less than LAT. When the reaction is carried out in more than one reaction zone, which may be provided in a single stage reactor vessel or by a chain of two or more reaction vessels, then two cases of this particular aspect of the invention can be distinguished.

In one particular case, the sum of the residence time of the catalyst in the activation unit and the residence time of the catalyst in the first reaction zone may be OAT+TR$_1$, where TR$_1$ is the time elapsed since OAT up to the moment the catalyst reaches a decrease of activity of less than 25% of the activity at OAT.

In another particular case, the sum of the residence time of the catalyst in the activation unit and the residence time of the catalyst in the first reaction zone may be OAT+TR2$_2$, where TR$_2$ is the time selected in such a way that OAT+TR$_2$ is less than LAT, preferentially less than ½ LAT and provided that the sum of the residence time. of the catalyst in the activation unit and the residence time of the catalyst in all reaction zones is less than LAT.

In still another particular case of this aspect of the invention, the catalyst system may be prepared in a separate catalyst activation unit and supplied to the reaction zone at CAT. In these cases, the sum of the residence time of the catalyst in the activation unit and the residence time of the catalyst in the reaction unit may preferentially be selected to be less than LAT.

In another embodiment of this aspect of the invention, the catalyst system is supplied to the reaction zone at any other time less than LAT providing that the sum of the residence time of the catalyst in the activation unit and the residence time of the catalyst in all reaction zones is less than LAT.

In one embodiment of the slurry polymerization process, the further α-olefin may thus be 1-butene.

In the loading step of the titanium tetrachloride on the activated support in the preparation of the Ziegler-Natta catalyst which is used, a mixture of ethanol and butanol or a mixture of ethanol, butanol and pentanol may then be used.

While the reaction temperature can be in the range of ambient to 120° C., it is preferably in the range of 50° C. to 100° C. and most preferably in the range of 60° C. to 90° C.

While the pressure can be in the range of atmospheric pressure to 60 kg/cm$^2$, it is preferably in the range of 3 kg/cm$^2$ to 30 kg/cm$^2$, still more preferably in the range of 4 kg/cm$^2$ to 18 kg/cm$^2$.

The parameters of the terpolymerization reaction of ethylene, 1-pentene and 1-butene in the slurry phase polymerization may be such that the resultant terpolymer of ethylene, 1-pentene and 1-butene satisfies the requisites or properties hereinbefore set out for such a terpolymer.

In another embodiment of the slurry polymerization process, the further α-olefin may thus be 1-octene.

In the loading step of the titanium tetrachloride on the activated support in the preparation of the Ziegler-Natta catalyst which is used, a mixture of ethanol and octanol or a mixture of ethanol, butanol and octanol may then be used.

While the reaction temperature can be in the range of ambient to 120° C., it is preferably in the range of 50° C. to 100° C. and most preferably in the range of 60° C. to 90° C.

While the pressure can be in the range of atmospheric pressure to 60 kg/cm², it is preferably in the range of 3 kg/cm² to 30 kg/cm², still more preferably in the range of 4 kg/cm² to 18 kg/cm².

The parameters of the terpolymerization reaction of ethylene, 1-pentene and 1-octene in the slurry phase polymerization may be such that the resultant terpolymer of ethylene, 1-pentene and 1-octene satisfies the requisites or properties hereinbefore set out for such a terpolymer.

In another embodiment of the slurry polymerization process, the further α-olefin may differ, as regards its total number of carbon atoms, by more than 1 unit from 1-pentene, and is not 1-octene.

In the loading step of the titanium tetrachloride on the activated support in the preparation of the Ziegler-Natta catalyst which is used, a mixture of ethanol and the alcohol with the same number of carbon atoms as with the third alpha olefin may be used, or a mixture of ethanol, pentanol and the alcohol with the same number of carbon atoms as with the third alpha olefin may be used.

While the reaction temperature can be in the range of ambient to 120° C., it is preferably in the range of 50° C. to 100° C. and most preferably in the range of 60° C. to 90° C.

While the pressure can be in the range of atmospheric pressure to 60 kg/cm², it is preferably in the range of 3 kg/cm² to 30 kg/cm², still more. preferably in the range of 4 kg/cm² to 18 kg/cm².

In another embodiment of the fourth and fifth aspects of the invention, as well as in an embodiment of the sixth aspect of the invention, a gas phase polymerization process is used.

In other words a gas or vapour phase process is employed to obtain particular terpolymers of ethylene/1-pentene and a further alpha olefin.

When vapour phase polymerization is used, the catalyst may also be in solid form, and preferably comprises a Ziegler-Natta catalyst. Thus, the ethylene, 1-pentene and to further α-olefin will be polymerized in vapour phase in the presence of the Ziegler-Natta catalyst or catalyst system in solid form, eg solid particulate form.

Any suitable Ziegler-Natta catalyst for ethylene polymerization in vapour phase can, at least in principle, then be used. More particularly a silica supported catalyst, a prepolymerized catalyst or a polymer diluted catalyst may be used. A catalyst system comprising a titanium based Ziegler Natta catalyst and, as co-catalyst, an organo aluminium compound, is preferred. Most preferred are a prepolymerized titanium catalyst and a polymer diluted titanium catalyst.

The catalyst may be that obtained by contacting activated anhydrous or partially anhydrized magnesium chloride with titanium tetrachloride in the presence of a plurality of alcohols as described above, with this catalyst then being further prepolymerized or polymer diluted.

Thus, in one particular case of this aspect of the vapour phase polymerization, a prepolymerized catalyst obtained by contacting a catalyst obtained from activated anhydrous magnesium chloride with titanium tetrachloride in the presence of a plurality of alcohols, with an α-olefin, can be used.

For the prepolymerization, α-olefins of 2 to 8 carbon atoms are preferred. The amount of polymer resulting from the prepolymerization is preferably in the range of 1 to 500 g polymer/g of catalyst. Two case regarding the amount of prepolymer obtained after the prepolymerization can be distinguished:

an amount of 2–5 g of prepolymer/g of catalyst an amount of 6–500 g of prepolymer/g of catalyst More particularly the prepolymer may be that obtained by terpolymerizing a mixture of ethylene, 1-pentene and a third α-olefin.

The Inventors surprisingly discovered that different terpolymers are obtained in the vapour phase terpolymerization according to this invention when (i) the third α-olefin differs, as regards its total number of carbon atoms, by more than 1 unit from 1-pentene; or (ii) the third α-olefin differs, as regards its total carbon atoms, by 1 unit from 1-pentene and has more carbon atoms than 1-pentene; or (iii) the third α-olefin differs, as regards its total carbon atoms, by 1 unit from 1-pentene and has fewer carbon atoms than 1-pentene.

The Inventors further surprisingly discovered that different terpolymers are obtained in the vapour phase terpolymerization process according to this invention if the prepolymer is obtained by terpolymerization as described above and the alpha olefins are employed in different proportions in the terpolymerization in order to obtain a prepolymer with different alpha olefin content. In the prepolymer formation, the ratio of the molar proportion of ethylene to the sum of the molar proportions of 1-pentene and the further α-olefin may be between 99,9:0,1 and 90:10.

The ratio of the molar proportion of 1-pentene to that of the further α-olefin may be between 0,01:99,99 and 99,99:0,01. The preferred third α-olefin content in the prepolymerization, based on the 1-pentene content, is greater than 10% by mass and, more preferably, greater than 20% by mass. The most preferred prepolymers are those obtained when the prepolymer has the same alpha olefin content as the final terpolymer obtained in the vapour phase terpolymerization.

In order to obtain the prepolymer, a cocatalyst may be used together with the particular catalyst as hereinbefore described. The co-catalyst employed may be an organo aluminium compound. Typical organo-aluminium compounds which can be used are compounds expressed by the formula $AlR_mX_{3-m}$ wherein R is a hydrocarbon component of 1 to 15 carbon atoms, X is a halogen atom, and m is a number represented by $0<m\leq 3$. Specific examples of suitable organo aluminium compounds which can be used are: a trialkyl aluminium, a trialkenyl aluminium, a partially halogenated alkyl aluminium, an alkyl aluminium sesquihalide, an alkyl aluminium dihalide. Preferred organo aluminium compounds are alkyl aluminium compounds, and the most preferred is triethylaluminium. The atomic ratio of aluminium to titanium in the catalyst system may be between 0,1:1 and 10000:1, preferably between 1:1 and 5000:1.

The prepolymer may be prepared in a separate stirred zone or vessel in suspension in a slurrying agent, and then supplied in slurry phase to the reaction zone in which the gas phase terpolymerization is effected, in order to terpolymerize the monomers. In this case the reaction temperature in the gas phase terpolymerization reaction zone may be sufficient for the small amount of catalyst slurrying agent to vaporize instantly at the pressure employed in the texpolymerization.

Instead, the prepolymer may be prepared or produced in a separate stirred zone or vessel in suspension in a slurrying agent and may be dried in a separate drying zone or unit provided to remove the slurrying agent from the catalyst slurry, with the resultant dry catalyst being supplied to the reaction zone in a dry form. In this case the temperature of the drying unit may be below the temperature which deactivates the prepolymer, ie the temperature above which the catalyst loses more than 10% of its activity over a period of 24 hours. The catalyst is carried to the reaction zone by means of an inert gas such as highly purified nitrogen.

Preferred slurrying or suspension agents are aliphatic or cyclo-aliphatic liquid hydrocarbons, with the most preferred being hexane and heptane.

The temperature during the prepolymerization may between −15 and 80° C., but must be kept constant during the prepolymerization. The pressure may be between atmospheric pressure and 10 kg/cm². According to this invention nitrogen or an inert gas should be present in the reaction medium in order to control the low amount of prepolymer obtained during the prepolymerization. The preferred amount of nitrogen is between 10% and 90% of the reaction gas phase present in the prepolymerization unit.

In another particular case of this aspect of the invention a polymer diluted catalyst may be used. The polymer is preferably used in powder form. The most preferred is a polymer in powder form with the same granularity as the final terpolymer. In other words a powder polymer with the same level of average particle size and/or average particle size distribution as the final terpolymer.

The polymer diluted catalyst may be that obtained by mixing a catalyst component and a polymer component. The catalyst component may be a catalyst as hereinbefore described, while the polymer component may comprise the polymer in powder for.

Any polymer inactive to the catalyst may then be used. The polymer is preferably an ethylene polymer, and the most preferred polymer is a terpolymer with the same monomer content as the terpolymer finally obtained in the gas phase polymerization according to this invention. The Inventors surprisingly discovered that any terpolymer of ethylene with 1-pentene and a third alpha olefin, which alpha olefin differs from 1-pentene by one carbon unit can be used successfully for the preparation of the polymer diluted catalyst.

The mixing of the catalyst component and the polymer component may be effected by mechanical stirring of the catalyst component with the polymer powder. Other known methods of stirring are also possible. The catalyst component may be added to the polymer powder in a powder form or in a slurry form. The Inventors found that the best results are obtained when the catalyst or catalyst component is added to a suspension of the powder polymer in an inert liquid hydrocarbon carrier liquid, the resultant slurry mixed and the carrier liquid evaporated to obtain a polymer diluted catalyst in powder form. In a particular case the polymer diluted catalyst slurry may be supplied directly to the gas phase polymerization zone provided that the temperature in the reaction zone allows immediate vaporization of the limited amount of carrier liquid of the polymer diluted catalyst.

A cocatalyst may be added to the polymer powder support prior to the addition of the catalyst or concomitantly therewith. The co-catalyst employed may be an organo aluminium compound. Typical organo-aluminium compounds which can be used are compounds expressed by the formula $AlR_mX_{3-m}$ wherein R is a hydrocarbon component of 1 to 15 carbon atoms, X is a halogen atom, and m is a number represented by $0<m\leq3$. Specific examples of suitable organo aluminium compounds which can be used are: a trialkyl aluminium, a trialkenyl aluminium, a partially halogenated alkyl aluminium, an alkyl aluminium sesquihalide, an alkyl aluminium dihalide. Preferred organo aluminium compounds are alkyl aluminium compounds, and the most preferred is triethylaluminium. The atomic ratio of aluminium to titanium in the catalyst system may be between 0,1:1 and 10000:1, preferably between 1:1 and 5000:1.

The mixing of the polymer powder with the catalyst as hereinbefore described in the presence or absence of the cocatalyst may be effected at a temperature between −10° C. and 40° C., preferably at ambient temperature.

The vapour phase reaction may be carried out in one or more stirred reaction zones, in a single stage reactor or a chain of two or more reactors, in a batch or continuous fashion, as described hereinbefore. The 1-pentene and further α-olefin may be added as a mixture or separately in a prevaporized vapour phase or in liquid phase and vaporized in the reaction zone.

The preferred reactor for the terpolymerization according to this invention is a stirred reactor, ie a reactor where the gas phase reaction medium and as well the mixture of the terpolymer obtained in powder form in the gas phase reaction medium are stirred by mechanical means known in the art.

The molecular weight of the resultant random terpolymer can be regulated by hydrogen addition to the reaction zone during the reaction. The greater the amount of hydrogen added, the lower will be the molecular weight of the random terpolymer.

An inert gas may also be present in the polymerization zone. Examples of inert gas according to this invention are highly purified nitrogen or argon with nitrogen being the most preferred.

In one embodiment of this aspect of the invention the presence of the nitrogen is not only possible but also desirable. In this case the nitrogen acts as a diluting agent for the gas polymerization medium and thereby controls the activity of the catalyst during the gas phase terpolymerization.

The parameters of the gas phase terpolymerization reaction of ethylene, 1-pentene and the further α-olefin may be such that the resultant terpolymer of ethylene, 1-pentene and the further α-olefin complies with the properties or requisites hereinbefore described in the first, second and third aspects of the invention.

The molecular weight distribution, ie the polidispersity index, n, as obtained from the ratio of the weight molecular weight and number molecular weight by nomenclature and measurements methods known in the literature, of such terpolymers can vary widely according to the particular prepolymerized catalyst employed.

In one embodiment of this aspect of the invention the polydispersity index of the terpolymer according to this invention is greater than 4.

However, in another embodiment of this aspect of the invention the polydispersity index of the terpolymer according to this invention is smaller than 4.

In yet a further embodiment of the fourth, fifth and sixth aspects of the invention, a solution phase polymerization is used.

When solution phase polymerization is used, the catalyst system may be soluble or insoluble in a liquid reaction medium, with the monomers and terpolymer being dissolved in the reaction medium throughout the polymerization reaction.

The liquid reaction medium may be a hydrocarbon or mixture of hydrocarbons selected such that the terpolymer is soluble therein at the reaction temperature. As an example, when cyclohexane is used as the liquid reaction medium, the reaction temperature should be higher than 90° C. to obtain dissolution of the terpolymer therein.

It is preferred to perform the solution polymerization just above the lowest temperature where the terpolymer is completely soluble in the liquid reaction medium.

The preferred temperature to perform the solution polymerization according to this invention is below 120° C., or even below 100° C.

In one embodiment of the invention, when solution phase polymerization is used, the catalyst system may comprise a catalyst used for solution polymerization of ethylene. In principle, any catalyst for solution copolymerization of ethylene with α-olefins may be used. The catalyst may thus be a vanadium catalyst such as $VCl_4$ or $VOCl_3$; a titanium catalyst, such as a titanium tetrachloride catalyst or a solubilized titanium trichloride catalyst; or a mixture of such a titanium catalyst and such a vanadium catalyst.

More preferably the catalyst may be that obtained by contacting activated magnesium chloride with titanium tetrachloride in the presence of a mixture of alcohols as described above.

Most preferably the catalyst may be that obtained by contacting activated magnesium chloride with titanium tetrachloride in the presence of a mixture of alcohols as described above, providing that in the loading step of the titanium tetrachloride on the activated support or magnesium chloride in the preparation of the Ziegler-Natta catalyst which is used, a mixture of ethanol and the alcohol with the same number of carbon atoms as the third alpha olefin or a mixture of ethanol, pentanol and the alcohol with the same number of carbon atoms as the third alpha olefin, is used.

The most preferred catalyst for the solution terpolymerization according to this invention is a catalyst with an activity higher than 10 g terpolymer/mg of Ti content in the catalyst.

Particular aspects of the solution phase polymerization according to this invention are whether the catalyst system is supplied to the reaction zone at "the optimum ageing time", or at "constant activity time" as previously described.

Thus in a particular case of the embodiment of the solution phase polymerization in the process aspect of the invention, a cocatalyst may be used, and the cocatalyst supplied first to the reaction zone in which the terpolymerization is being effected, and then the catalyst after a period of time. In another particular case of this aspect of the invention the cocatalyst is supplied simultaneously with the catalyst to the reaction zone. In both these cases, the residence time of the reaction mixture preferentially selected to be below LAT.

In still another case of this aspect of the invention, the catalyst system may be prepared in a separate catalyst activation unit and is supplied to the reaction zone at OAT. In this case the sum of the residence time of the catalyst in the activation unit and the residence time of the catalyst in the reaction unit may be preferentially selected to be below LAT. When the reaction is carried out in a plurality of reaction zones, which may be provided in a single stage reactor vessel or by a chain of two or more reaction vessels, then two cases of this particular aspect of the invention can be distinguished.

In one particular case, the sum of the residence time of the catalyst in the activation unit and the residence time of the catalyst in the first reaction zone may be $OAT+TR_1$, where $TR_1$ is the time elapsed since OAT to the moment the catalyst reaches a decrease of activity of less than 25% of the activity at OAT.

In another particular case, the sum of the residence time of the catalyst in the activation unit and the residence time of the catalyst in the first reaction zone may be $OAT+TR_2$, where $TR_2$ is the time selected such that $OAT+TR_2$ is less than LAT, preferentially less than ½ LAT and provided that the sum of the residence time of the catalyst in the activation unit and the residence time of the catalyst in all reaction zones is less than LAT.

In still another particular case of this aspect of the invention the catalyst system prepared in a separate catalyst activation unit is supplied to the reaction zone at CAT. In these cases the sum of residence time of the catalyst in the activation unit and the residence time of the catalyst in the reaction unit may be preferentially selected to be less than LAT.

In another embodiment of this aspect of the invention, the catalyst system is supplied to the reaction zone at any other time less than LAT providing that the sum of the residence time of the catalyst in the activation unit and the residence time of the catalyst in all reaction zones is less than LAT.

The parameters of solution terpolymerization reaction of ethylene, 1-pentene and a further α-olefin may be such that the resultant terpolymer of ethylene, 1-pentene and the further α-olefin complies with the properties or requisites hereinbefore described in the first, second and third aspects of the invention.

The molecular weight distribution of such terpolymers can vary widely according to a particular catalyst employed.

In one embodiment of this aspect of the invention, the polydispersity index of the terpolymer according to this invention is higher than 3.

In another embodiment of the invention, when solution phase polymerization is used, the catalyst or catalyst system may comprise a metallocene catalyst. Any suitable metallocene catalyst for ethylene polymerization in solution can, at least in principle, then be used. Examples of metallocenes which can be used are Group IV transition metallocenes (titanocenes, zirconocenes, hafnocenes), which are characterized by two bulky cyclopentadienyl (Cp) or substituted cyclopentadienyl ligands (Cp'), metallocenes with two Cp' ligands arranged in a chiral array and connected together with chemical bonds by a bridging group, and cationic metallocenes. Preferred metallocene catalysts are $(CpR)_2ZrX_2$ catalysts, where R is H, Me (methyl), Et (ethyl), Pr (propyl), i-Pr, Bu (butyl), i-Bu, $SiMe_3$, and X is Cl.

The metallocene catalyst can be used as part of a catalyst system containing also a co-catalyst which activates the metallocene. Examples of such co-catalysts are alumoxanes such as methyl alumoxane (MAO), ethyl alumoxane (EAO), and isobutylalumoxane.

In one embodiment of this aspect of the invention the terpolymerization is performed in the presence of one of the preferred metallocene $(CpR)_2ZrX_2$ catalysts, where R is H, Me (methyl), Et (ethyl), Pr (propyl), i-Pr, Bu (butyl), i-Bu, $SiMe_3$, and X is Cl and with MAO as co-catalyst.

In another embodiment of this aspect of the invention the terpolymerization is performed in the presence of one of the preferred metallocene $(CpR)_2ZrX_2$ catalysts, where R is H, Me (methyl), Et (ethyl), Pr (propyl), i-Pr, Bu (butyl), i-Bu, $SiMe_3$, and X is Cl and with EAO as co-catalyst.

Different methods of adding the cocatalyst can be distinguished:

- mixing the metallocene catalyst with the cocatalyst under inert conditions in an inert solvent and bringing the activated complex catalyst formed into the terpolymerization reaction zone prior or continuously during the terpolymerization;
- mixing the cocatalyst with a solvent provided for the polymerization, and thereafter introducing the catalyst to form the catalyst complex prior to the terpolymerization;
- continuously supplying the catalyst and the cocatalyst to the reaction zone during the polymerization with the formation of the activated complex during the terpolymerization.

The parameters of metallocene terpolymerization reaction of ethylene, 1-pentene and the further α-olefin may be such that the resultant terpolymer of ethylene, 1-pentene and the further α-olefin complies with the properties or requisites as hereinbefore described in the first, second and third aspects of the invention.

The molecular weight distribution of such terpolymers can vary according to a particular metallocene catalyst employed, a particular co-catalyst employed and a particular mixture of alpha olefins employed.

In one embodiment of this aspect of the invention the polydispersity index of the terpolymer according to this invention is lower than 3.

According to a seventh aspect of the invention, there is provided a method of making a prepolymerized catalyst, which includes polymerizing an olefin having a carbon number between 2 and 8, in the presence of a catalyst obtained by mixing an ether having a total number of carbon atoms equal to or greater than 8, with a partially anhydrised magnesium chloride having a water content of 0,02 mole to 2 mole of water per 1 mole of magnesium chloride at a temperature of 40° C. to 140° C., to produce a partially activated magnesium chloride;

adding, dropwise, an alkyl aluminium compound to the partially activated magnesium chloride in order to obtain unwashed activated magnesium chloride;

washing the activated magnesium chloride with an inert hydrocarbon liquid to obtain an activated magnesium chloride-containing slurry;

mixing a plurality of alcohols with the activated magnesium chloride-containing slurry to obtain an activated support/alcohol complex; and mixing titanium tetrachloride with the activated support/alcohol complex, to form the catalyst.

The invention will be illustrated by way of the following non-limiting examples.

EXAMPLE 1
Catalyst A preparation

In a 250 ml flask. equipped with a reflux condenser and stirring facilities, were suspended 2 g of anhydrised magnesium chloride with a water content of 1,5% in 60 ml highly purified hexane. Thereafter, 3 ml of dibutyl ether was added and the mixture was stirred for 3 hours. 10 g of triethyl aluminium was added dropwise to the flask to avoid excessive heat build-up, and the mixture allowed to cool to room temperature under stirring. The slurry was then subjected to twelve washings using 50 ml hexane each time.

To the activated support thus formed, 2 ml of a 1:1:1 molar mixture of ethanol, pentanol and butanol was added and the slurry stirred for 3 hours. Thereafter, 20 ml of $TiCl_4$ was added, and the mixture stirred under reflux. After cooling down, the slurry was subjected to ten washings using 50 ml heptane each time. After the final washing, the slurry concentration was adjusted to 0,01 g catalyst/1 ml heptane slurry.

EXAMPLE 2
Catalyst B Preparation

Example 1 was repeated except that magnesium chloride with an amount of 5% water (by mass) was used for the catalyst preparation.

EXAMPLE 3
Catalyst C Preparation

Example 1 was repeated except that dipentyl ether instead of dibutyl ether was used in the catalyst preparation.

EXAMPLE 4
Catalyst D Preparation

In a 250 ml flask equipped with a ref lux condenser and stirring facilities, were suspended 2 g of anhydrised magnesium chloride with a total water content of 5% (by mass) in 60 ml highly purified hexane. Thereafter, 2 ml of dibutyl ether was added and the mixture was stirred for 3 hours. An amount of 9 g of triethyl aluminium was added dropwise to the flask to avoid excessive heat build-up, and the mixture allowed to cool to room temperature under stirring. The slurry was then subjected to twelve washings using 50 ml hexane each time.

To the activated support thus formed, 2 ml of a 1:1 molar mixture of ethanol and octanol was added, and the slurry stirred for 3 hours. Thereafter, 20 ml of $TiCl_4$ was added, and the mixture stirred under ref lux. After cooling down, the slurry was subjected to ten washings using 50 ml heptane each time. After the final washing the slurry concentration was adjusted to 0,01 g catalyst/1 ml heptane slurry.

EXAMPLE 5
Catalyst E Preparation

Example 4 was repeated except that magnesium chloride with an amount of 1,5% (by mass) water was used for the catalyst preparation.

EXAMPLE 6
Catalyst F Preparation

Example 5 was repeated except that to the activated support thus formed, 2 ml of a 1:1:1 molar mixture of ethanol, pentanol and octanol was added instead of 2 ml of a 1:1 molar mixture of ethanol and octanol.

EXAMPLE 7
Catalyst G Preparation

Example 6 was repeated except that dipentyl ether instead of dibutyl ether was used in the catalyst preparation.

EXAMPLE 8
Catalyst H Preparation

In a 250 ml flask equipped with a reflux condenser and stirring facilities, were suspended 2 g of anhydrised magnesium chloride with a water content of 1,5% in 60 ml highly purified hexane. Thereafter, 3 ml of dipentyl ether was added at 50° C. and the mixture was stirred for 3 hours. 10 g of triethyl aluminium was added dropwise to the flask to avoid excessive heat build-up, and the mixture allowed to cool to room temperature under stirring. The slurry was then subjected to twelve washings using 50 ml hexane each time.

To the activated support thus formed, 2 ml of a 1:1:1 molar mixture of ethanol, pentanol and hexanol was added. and the slurry stirred for 3 hours Thereafter, 20 ml of $TiCl_4$ was added, and the mixture stirred under reflux. After cooling down, the slurry was subjected to ten washings using 50 ml heptane each time. After the final washing, the slurry concentration was adjusted to 0,01 g catalyst/1 ml heptane slurry.

EXAMPLE 9
Determination of OAT, CAT and LAT for Catalyst B 225 ml of a 10% solution of triethyl aluminium in n-heptane was introduced into a 500 ml flask under inert conditions and heated to 80° C. Thereafter, 25 ml of catalyst B was introduced under inert conditions and the temperature maintained at 80° C. At different time intervals 1 ml of catalyst was transferred from the flask and introduced into a 1 l reaction vessel where previously 300 g of n-heptane had been heated under stirring to 80° C. The pressure was then increased rapidly to 2 kg/cm$^2$ with hydrogen and settled at 15 kg/cm$^2$ with ethylene. The pressure was maintained with ethylene for a total time of 1 hour whereafter the reactor was depressurized and the catalyst decomposed with propanol. The resultant polymer was then filtered and repeatedly washed with propanol, methanol, and acetone. The polymer was dried in a vacuum oven at 70° C. for 24 hours. The yield of the polymer was measured for each separate case.

The following series of results were obtained:

| sampling time (min) | polymer yield (g) | productivity Kg/g |
| --- | --- | --- |
| 0,5 | 7,6 | 7,6 |
| 3 | 15 | 15 |
| 7,5 | 34 | 34 |
| 11 | 17 | 17 |
| 15 | 14,2 | 14,2 |
| 20 | 12,5 | 12,5 |
| 30 | 11,0 | 11,0 |
| 60 | 10,8 | 10,8 |
| 120 | 10,0 | 10,0 |

Thus for catalyst B:

$^{80}OAT^{C2}$ is 7,5

$^{80}CAT^{C2}$ is 30

$^{80}LAT^{C2}$ is 120

EXAMPLE 10

Example 9 was repeated except that catalyst H was used instead of catalyst B.

Thus for catalyst H:

$^{85}OAT^{C2}$ is 7

$^{85}CAT^{C2}$ is 30

$^{85}LAT^{C2}$ is 180

EXAMPLE 11

Example 9 was repeated except that catalyst F was used instead of catalyst B.

Thus for catalyst F:

$^{80}OAT^{C2}$ is 8,5

$^{80}CAT^{C2}$ is 30

$^{80}LAT^{C2}$ is 120

EXAMPLE 12

3000 g of highly purified n-heptane was introduced into a 10 l stainless steel polymerization vessel provided with agitation. After a thorough purging of the vessel with nitrogen, 150 ml of triethylaluminium (10% solution in heptane), and 1,2 ml of catalyst A was introduced into the vessel. The temperature was set to 85° C. and 3000 mg of hydrogen introduced into the vessel. After 10 minutes, a simultaneous supply of ethylene at constant flow rate of 8,4 g/min, and a 3:10 mass mixture of n-butene-1 and n-pentene-1 at a flow rate of 10,8 g/min was commenced. The reaction was continued for two hours.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 900 g.

The amount of n-pentene incorporated in the terpolymer was 2%. The amount of n-butene incorporated in the terpolymer was 0,7%. The melt flow index of the terpolymer as measured according to ASTM D 1238 was 3,6. The density of the terpolymer as measured according to ASTM D1505 was 0,9228.

A bottom fed blown film of 30 microns was obtained from the terpolymer on a 31,75 mm extruder at 210° C. melt temperature and a take off speed of 4,2 m/min.

The tensile strength at break, as measured according to ASTM D 882, was 33,7 MPa in the machine direction (MD) and 25,2 MPa in the transverse direction (TD).

The tensile strength at yield, as measured according to ASTM D 882 was 15,6 MPa in the machine direction (MD) and 13,2 MPa in the transverse direction (TD).

EXAMPLE 13

3000 g of highly purified n-heptane was introduced into a 10 l stainless steel polymerization vessel provided with agitation. After a thorough purging of the vessel with nitrogen the temperature was raised to 80° C. 21 ml of catalyst system B prepared according to example 9 at constant activity time of 30 min was introduced into the vessel. The temperature was maintained at 80° C. and a further 1500 mg of hydrogen introduced into the vessel and a simultaneous supply of ethylene at constant flow of 10 g/min, and a 1:2 mass mixture of n-butene-1 and n-pentene-1, at a flow rate of 13 g/min was commenced. The reaction was continued for 90 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 392 g.

The amount of n-pentene incorporated in the terpolymer was 0,35%. The amount of n-butene incorporated in the terpolymer was 0,35%. The melt flow index of the terpolymer as measured according to ASTM D 1238 was 0,77. The density of the terpolymer as measured according to ASTM D1505 was 0,9428.

A bottom fed blown film of 30 microns was obtained from the terpolymer on a 31,75 mm extruder at 210° C. melt temperature and a take off speed of 4,2 m/min.

The tensile strength at break, as measured according to ASTM D 882, was 25,4 MPa in the machine direction (MD) and 22,7 MPa in the transverse direction (TD).

The tensile strength at yield, as measured according to ASTM D 882 was 16,2 MPa in the machine direction (MD) and 14,7 MPa in the transverse direction (TD).

EXAMPLE 14

3000 g of highly purified n-heptane was introduced into a 10 l stainless steel polymerization vessel provided with agitation. After a thorough purging of the vessel with nitrogen the temperature was raised to 80° C. 15 ml of catalyst system B prepared according to example 9 at optimum activity time of 7,5 min was introduced into the vessel. The temperature was maintained at 80° C. and 1500 mg of hydrogen introduced into the vessel and a simultaneous supply of ethylene at constant flow of 8 g/min, and a mixture of 1300 g n-butene-1 and 500 g n-pentene-1, at a flow rate of 12 g/min was commenced. The reaction was continued for 117 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 970 g.

The amount of n-pentene incorporated in the terpolymer was 0,5%. The amount of n-butene incorporated in the terpolymer was 1,65%. The melt flow index of the terpolymer as measured according to ASTM D 1238 was 3,22. The density of the terpolymer as measured according to ASTM D1505 was 0,9289.

A bottom fed blown film of 30 microns was obtained from the terpolymer on a 31,75 mm extruder at 210° C. melt temperature and a take off speed of 4,2 m/min.

EXAMPLE 15

3000 g of highly purified n-heptane was introduced into a 10 l stainless steel polymerization vessel provided with agitation. After a thorough purging of the vessel with nitrogen, 45 ml of triethylaluminium (10% solution in heptane), and 3,6 ml of catalyst C was introduced into the vessel. The temperature was set to 85° C. and 3000 mg of hydrogen introduced into the vessel. After 10 minutes, a simultaneous supply of ethylene at constant flow of 10 g/min, and a 5:1 mixture by mass of n-butene-1/n-pentene-1, at a flow rate of 6 g/min was commenced. The reaction was continued for 100 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 870 g.

The amount of n-pentene incorporated in the terpolymer was around 0,1%. The amount of n-butene incorporated in the terpolymer was 0,5%. The melt flow index of the terpolymer as measured according to ASTM D 1238 was 3,5. The density of the terpolymer as measured according to ASTM D1505 was 0,9419.

A bottom fed blown film of 30 microns was obtained from the terpolymer on a 31,75 mm extruder at 210° C. melt temperature and a take off speed of 4,2 m/min.

The tensile strength at break, as measured according to ASTM D 882, was 31,1 MPa in the machine direction (MD) and 23,1 MPa in the transverse direction (TD).

The tensile strength at yield, as measured according to ASTM D 882 was 17,9 MPa in the machine direction (MD) and 14,9 MPa in the transverse direction (TD).

EXAMPLE 16

3000 g of highly purified n-heptane was introduced into a 10 l stainless steel polymerization vessel provided with agitation. After a thorough purging of the vessel with nitrogen, 150 ml of triethylaluminium (10% solution in heptane), and 5 ml of catalyst A was introduced into the vessel. The temperature was set to 85° C. and 3000 mg of hydrogen introduced into the vessel. After 10 minutes, a simultaneous supply of ethylene at constant flow of 10 g/min and a 9:1 mixture by mass of n-butene-1/n-pentene-1 at a flow rate of 6,6 g/min was commenced. The reaction was continued for 60 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 550 g.

The amount of n-pentene incorporated in the terpolymer was below 0,1%. The amount of n-butene incorporated in the terpolymer was 0, 5%. The melt flow index of the terpolymer as measured according to ASTM D 1238 was 7. The density of the terpolymer as measured according to ASTM D1505 was 0,9499.

A bottom fed blown film of 30 microns was obtained from the terpolymer on a 31,75 mm extruder at 210° C. melt temperature and a take off speed of 4,2 m/min.

The tensile strength at break, as measured according to ASTM D 882, was 28,1 MPa in the machine direction (MD) and 25,1 MPa in the transverse direction (TD).

The tensile strength at yield, as measured according to ASTM D 882 was 17,9 MPa in the machine direction (MD) and 14,9 MPa in the transverse direction (TD).

EXAMPLE 17

2500 g of highly purified n-heptane was introduced into a 10 l stainless steel polymerization vessel provided with agitation. After a thorough purging of the vessel with nitrogen, 100 ml of triethylaluminium (10% solution in heptane), and 3 ml of the catalyst D were introduced into the vessel. The temperature was set to 85° C. and 1000 mg of hydrogen were introduced. After 10 minutes, a simultaneous supply of ethylene at constant flow of 8,4 g/min and a 1:5 mass mixture of n-octene-1 and n-pentene-1 at a flow rate of 10 g/min was commenced. The reaction was continued for two hours.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 690 g.

The amount of n-pentene incorporated in the terpolymer was 1,7%. The amount of n-octene incorporated in the terpolymer was 0,4%. The melt flow index of the terpolymer as measured according to ASTM D 1238 was 2,8. The density of the terpolymer as measured according to ASTM D1505 was 0,9230.

A bottom fed blow film of 30 microns was obtained from the terpolymer on a 31,75 mm extruder at 210° C. melt temperature and a take off speed of 4,2 m/min.

The impact strength, as measured according to ASTM D 1709, was 80 g.

The tear strength, as measured according to ASTM 1922, of 2,3 g/$\mu$m in the machine direction (MD) and 11 g/$\mu$m in the transverse direction (TD).

EXAMPLE 18

2500 g of highly purified n-heptane was introduced into a 10 l stainless steel polymerization vessel provided with agitation. After a thorough purging of the vessel with nitrogen, 150 ml of triethylaluminium (10% solution in heptane), and 3 ml of the catalyst E were introduced into the vessel. The temperature was set to 85° C. and 1000 mg of hydrogen were introduced. After 10 minutes, a simultaneous supply of 1000 g of ethylene at 4 g/min at constant flow, and 1100 g of a 1:10 mass mixture of n-octene-1 and n-pentene-1, at 4,4 g/min was commenced. The reaction was continued for 250 min.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 960 g.

The amount of n-pentene incorporated in the terpolymer was 1,5%. The amount of n-octene incorporated in the terpolymer was 0,1%. The melt flow index of the terpolymer as measured according to ASTM D 1238 was 2,4. The density of the terpolymer as measured according to ASTM D1505 was 0,9289.

A bottom fed blow film of 30 microns was obtained from the terpolymer on a 31,75 mm extruder at 210° C. melt temperature and a take off speed of 4,2 m/min.

EXAMPLE 19

2500 g of highly purified n-heptane was introduced into a 10 l stainless steel polymerization vessel provided with agitation. After a thorough purging of the vessel with nitrogen, 15 ml of triethylaluminium (10% solution in heptane), and 1 ml of the catalyst F were introduced into the vessel. The temperature was set to 80° C. and 3000 mg of hydrogen were introduced. After 10 minutes, a simultaneous supply of ethylene at a constant flow of 8 g/min and a 10:1 mass mixture of n-octene-1 and n-pentene-1, at a flow rate of 16 g/min was commenced. The reaction was continued for 120 min.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 750 g.

The amount of n-pentene incorporated in the terpolymer was 0,1%. The amount of n-octene incorporated in the terpolymer was below 0,7%. The melt flow index of the terpolymer as measured according to ASTM D 1238 was 8,6. The density of the terpolymer as measured according to ASTM D1505 was 0,9381.

A bottom fed blow film of 30 microns was obtained from the terpolymer on a 31,75 mm extruder at 210° C. melt temperature and a take off speed of 4,2 m/min.

The impact strength, as measured according to ASTM D 1709, was 70 g.

The tear strength, as measured according to ASTM 1922, of 2,8 g/$\mu$m in the machine direction (MD) and 12,5 g/$\mu$m in the transverse direction (TD).

EXAMPLE 20

3000 g of highly purified n-heptane was introduced into a 10 l stainless steel polymerization vessel provided with agitation. After a thorough purging of the vessel with nitrogen, 15 ml of triethylaluminium (10% solution in heptane), and 1 ml of the catalyst G were introduced into the vessel. The temperature was set to 85° C. and 2000 mg of hydrogen were introduced. After 10 minutes, a simultaneous supply of 900 g of ethylene at a constant flow of 10 g/min and a 2:1 mass mixture of n-octene-1 and n-pentene-1, at a flow rate of 7 g/min was commenced. The reaction was continued for 90 min.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 625 g.

The amount of n-pentene incorporated in the terpolymer was 0,3%. The amount of n-octene incorporated in the terpolymer was 0,3%. The melt flow index of the terpolymer as measured according to ASTM D 1238 was 2,3. The density of the terpolymer as measured according to ASTM D1505 was 0,9410.

A bottom fed blow film of 30 microns was obtained from the terpolymer on a 31,75 mm extruder at 210° C. melt temperature and a take off speed of 4,2 m/min.

The impact strength, as measured according to ASTM D 1709, was 60 g.

The tear strength, as measured according to ASTM 1922, of 2,5 g/$\mu$m in the machine direction (MD) and 11,9 g/$\mu$m in the transverse direction (TD).

EXAMPLE 21

Prepolymer P1 Preparation 300 ml of highly purified n-heptane was added to a 1 l stainless steel reaction vessel provided with agitation. Further 10 ml of a 10 wt % solution of triethyl aluminium in n-heptane followed by 4 g of catalyst G was introduced into the reactor at ambient temperature. After 5 minutes of stirring the reactor was pressurized with ethylene to 3 kg/cm$^2$. Further 15 g of ethylene and 5 g of a mixture of 1-pentene/1-octene with a 5/1 wt ratio were introduced and the reaction continued for 30 min. The prepolymerized catalyst slurry was filtered through a sintered metal sieve at the bottom of the reactor after which the reaction vessel was disassembled in a dry box and the prepolymerized catalyst collected. The n-heptane was allowed to evaporate and 18,9 g of prepolymer P1 was collected.

EXAMPLE 22

Prepolymer P2 Preparation 300 ml of highly purified n-heptane was added to a 1 l stainless steel reaction vessel provided with agitation. 10 ml of a 10 wt % solution of triethyl aluminium in n-heptane followed by 2 g of catalyst H was introduced into the reactor at ambient temperature. After 5 minutes of stirring the reactor was pressurized with ethylene to 3 kg/cm$^2$. 20 g of ethylene and 5 g of a mixture of 1-pentene/1-hexene with a 7,5/1 wt ratio was introduced and the reaction continued for 30 min. The prepolymerized catalyst slurry was filtered through a sintered metal sieve at the bottom of the reactor after which the reaction vessel was disassembled in a dry box and the prepolymerized catalyst collected. The n-heptane was allowed to evaporate and 19,5 g of prepolymer P2 was collected.

EXAMPLE 23

Prepolymer P3 Preparation 300 ml of highly purified n-heptane was added to a 1 litre stainless steel reaction vessel provided with agitation. 10 ml of a 10 wt % solution of triethyl aluminium in n-heptane followed by 2 g of catalyst B was introduced into the reactor at ambient temperature. After 5 minutes of stirring the reactor was pressurized with ethylene to 3 kg/cm$^2$. 40 g of ethylene and 2 g of a mixture of 1-pentene/1-butene with a 1/1 wt ratio were introduced and the reaction continued for 30 min. The prepolymerized catalyst slurry was filtered through a sintered metal sieve at the bottom of the reactor after which the reaction vessel was disassembled in a dry box and the prepolymerized catalyst collected. The n-heptane was allowed to evaporate and 40 g of prepolymer was collected. 0,5 g of the prepolymerized catalyst was resuspended in 5 ml n-heptane and a suspension of prepolymer P3 was obtained.

EXAMPLE 24

Under inert conditions 0,05 g of prepolymerized catalyst P2 was added to 0,5 ml of a 10 wt % solution of triethyl aluminium in n-heptane. The obtained mixture was introduced in a 1 l stainless steel gas phase reaction vessel provided with a combination of helical and vertical stirring, preheated to 80° C. Further 300 mg of hydrogen was introduced and the reaction vessel further pressurized to 5 bar with nitrogen. 100 g of ethylene were fed to the reactor at a rate of 2 g/min and at the same time a 1:1 molar mixture of 1-pentene and 1-hexene was fed at a rate of 0,6 g/min. After 50 min the feed of ethylene and the 1-pentene/1-hexene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 92 g.

The amount of n-pentene incorporated in the terpolymer was 1,2%. The amount of n-hexene incorporated in the terpolymer was 1,1%. The melt flow index of the terpolymer as measured according to ASTM D 1238 was 0,8. The density of the terpolymer as measured according to ASTM D1505 was 0,9216.

A sample of the terpolymer thus obtained was injection moulded according to ASTM D 647 and had the following properties:
 (a) an Izod notched impact strength, as measured according to ASTM D 256, of 45,6 kJ/m$^2$.
 (b) a tensile strength at yield, as measured according to ASTM D 256 M, of 10,5 MPa
 (c) a modulus as measured according to ASTM D 256 M, of 292 MPa.

The terpolymer had a polydispersity index of 4,2.

EXAMPLE 25

Under inert conditions 0,05 g of prepolymerized catalyst P2 was added to 0,5 ml of a 10 wt % solution of triethyl aluminium in n-heptane. The obtained mixture was introduced in a 1 l stainless steel gas phase reaction vessel provided with, a combination of helical and vertical stirring, preheated to 80° C. 300 mg of hydrogen were introduced and the reaction vessel further pressurized to 5 bar with nitrogen. 100 g of ethylene was fed to the reactor at a rate of 2 g/min and at the same time a 10:1 molar mixture of 1-pentene and 1-hexene was fed at a rate of 0,4 g/min. After 50 min the feed of ethylene and the 1-pentene/1-hexene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 85 g.

The amount of n-pentene incorporated in the terpolymer was 1,5%. The amount of n-hexene incorporated in the terpolymer was 0,15%. The melt flow index of the terpolymer as measured according to ASTM D 1238 was 0,5. The density of the terpolymer as measured according to ASTM D1505 was 0,9296.

A sample of the terpolymer thus obtained was injection moulded according to ASTM D 647, had the following properties:
 (a) an Izod notched impact strength, as measured according to ASTM D 256, of 44,2 kJ/m$^2$.
 (b) a tensile strength at yield, as measured according to ASTM D 256 M, of 10,65 MPa
 (c) a modulus as measured according to ASTM D 256 M, of 308 MPa.

EXAMPLE 26

Under inert conditions 0,05 g of prepolymerized catalyst P2 was added to 0,5 ml of a 10 wt % solution of triethyl aluminium in n-heptane. The obtained mixture was introduced in a 1 l stainless steel gas phase reaction vessel provided with a combination of helical and vertical stirring, preheated to 80° C. 400 mg of hydrogen were introduced and the reaction vessel further pressurized to 5 bar with nitrogen. 100 g of ethylene was fed to the reactor on a separate line at a rate of 2 g/min and at the same time a 1:10 molar mixture of 1-pentene and 1-hexene was fed at a rate of 0,6 g/min on a separate line via a preheater to vaporize the mixture of 1-pentene/1-hexene. After 50 min the feed of ethylene and the 1-pentene/1-hexene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 88 g.

The amount of n-pentene incorporated in the terpolymer was 0,25%. The amount of n-hexene incorporated in the terpolymer was 2,5%. The melt flow index of the terpolymer as measured according to ASTM D 1238 was 2. The density of the terpolymer as measured according to ASTM D1505 was 0,9192. The polydispersity index of the terpolymer as measured against polystyrene standards was 3,1.

A sample of the terpolymer thus obtained was injection moulded according to ASTM D 647, had the following properties:
 (a) an Izod notched impact strength, as measured according to ASTM D 256, of 42,00 kJ/m$^2$.
 (b) a tensile strength at yield, as measured according to ASTM D 256 M, of 9,88 MPa
 (c) a modulus as measured according to ASTM D 256 M, of 266 MPa.

EXAMPLE 27

Under inert conditions 0,05 g of prepolymerized catalyst P1 was added to 0,5 ml of a 10 wt % solution of triethyl aluminium in n-heptane. The obtained mixture was introduced in a 1 l stainless steel gas phase reaction vessel provided with a combination of helical and vertical stirring, preheated to 80° C. 400 mg of hydrogen were introduced and the reaction vessel further pressurized to 5 bar with nitrogen. 120 g of ethylene was fed to the reactor at a rate of 2 g/min and at the same time a 1:4 molar mixture of 1-pentene and 1-octene was fed at a rate of 0,4 g/min on a separate line via a preheater to vaporize the mixture of 1-pentene/1-octene. After 60 min the feed of ethylene and the 1-pentene/1-octene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 118 g.

The amount of n-pentene incorporated in the terpolymer was 0,8%. The amount of n-octene incorporated in the terpolymer was 1,2%. The melt flow index of the terpolymer as measured according to ASTM D 1238 was 5,6. The density of the terpolymer as measured according to ASTM D1505 was 0,9199. The polydispersity index of the terpolymer as measured against polystyrene standards was 5,4.

A sample of the terpolymer thus obtained was injection moulded according to ASTM D 647, had the following properties:
(a) an Izod notched impact strength, as measured according to ASTM D 256, of 39,8 kJ/m$^2$.
(b) a tensile strength at yield, as measured according to ASTM D 256 M, of 9,07 MPa
(c) a modulus as measured according to ASTM D 256 M, of 292 MPa.

EXAMPLE 28

Under inert conditions 0,5 ml of prepolymerized catalyst P3 was added to 0,5 ml of a 10 wt % solution of triethyl aluminium in n-heptane. The obtained mixture was introduced in a 1 l stainless steel gas phase reaction vessel provided with a combination of helical and vertical stirring, preheated to 80° C. 300 mg of hydrogen was introduced and the reaction vessel further pressurized to 5 bar with nitrogen. 100 g of ethylene was fed to the reactor at a rate of 2 g/min and at the same time a 2:1 molar mixture of 1-pentene and 1-butene was fed at a rate of 0,6 g/min. After 50 min the feed of ethylene and the 1-pentene/1-butene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 80 g.

The amount of n-pentene incorporated in the terpolymer was 1,5%. The amount of n-butene incorporated in the terpolymer was 1,3%. The melt flow index of the terpolymer as measured according to ASTM D 1238 was 0,9. The density of the terpolymer as measured according to ASTM D1505 was 0,9198.

A sample of the terpolymer thus obtained was injection moulded according to ASTM D 647, had the following properties:
(a) an Izod notched impact strength, as measured according to ASTM D 256, of 36,6 kJ/m$^2$.
(b) a tensile strength at yield, as measured according to ASTM D 256 M, of 8,16 MPa
(c) a modulus as measured according to ASTM D 256 M, of 211 MPa.

EXAMPLE 29

7 mg of catalyst G was mixed under inert conditions with 1 ml of a 10% wt solution of triethyl aluminium in n-heptane. After two min, 1 g of a fine powder of a predried terpolymer obtained according to Example 27 was added to this catalyst system mixture and thoroughly mixed. This mixture was introduced into a 1 l stainless steel gas phase reaction vessel provided with a combination of helical and vertical stirring, preheated to 80° C. Further 300 mg of hydrogen was introduced and the reaction vessel pressurized to 5 bar with nitrogen. Ethylene was fed to the reactor at a rate of 2 g/min and at the same time a 1:4 molar mixture of 1-pentene and 1-octene was fed at a rate of 0,4 g/min. After 50 min the feed of ethylene and the 1-pentene/1-octene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 75 g.

The amount of n-pentene incorporated in the terpolymer was 0,8%. The amount of n-hexene incorporated in the terpolymer was 1,3%. The melt flow index of the terpolymer as measured according to ASTM D 1238 was 4. The density of the terpolymer as measured according to ASTM D1505 was 0,9172.

A sample of the terpolymer thus obtained was injection moulded according to ASTM D 647, had the following properties:
(a) an Izod notched impact strength, as measured according to ASTM D 256, of 39,4 kJ/m$^2$.
(b) a tensile strength at yield, as measured according to ASTM D 256 M, of 9,8 MPa
(c) a modulus as measured according to ASTM D 256 M, of 294 MPa.

EXAMPLE 30

7 mg of catalyst H was mixed under inert conditions with 1 ml of a 10% wt solution of triethyl aluminium in n-heptane. An amount of 10 ml n-heptane were added and after two min, 1 g of a fine powder of a predried terpolymer obtained according to example 26 was added to this catalyst system mixture and thoroughly mixed. The solvent was further evacuated by vacuum and the obtained polymer diluted catalyst mixture was introduced in a 1 l stainless steel gas phase reaction vessel provided with a combination of helical and vertical stirring, preheated to 80° C. Further 300 mg of hydrogen was introduced and the reaction vessel pressurized to 5 bar with nitrogen. Ethylene was fed to the reactor at a rate of 2 g/min and at the same time a 1:1 molar mixture of 1-pentene and 1-hexene was fed at a rate of 0,4 g/min. After 60 min the feed of ethylene and the 1-pentene/1-hexene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 105 g.

The amount of n-pentene incorporated in the terpolymer was 1,2%. The amount of n-hexene incorporated in the terpolymer was 1,0%. The melt flow index of the terpolymer as measured according to ASTM D 1238 was 4. The density of the terpolymer as measured according to ASTM D1505 was 0,9217.

A sample of the terpolymer thus obtained was injection moulded according to ASTM D 647, had the following properties:
(a) an Izod notched impact strength, as measured according to ASTM D 256, of 39,3 kJ/m$^2$.
(b) a tensile strength at yield, as measured according to ASTM D 256 M, of 9,3 MPa
(c) a modulus as measured according to ASTM D 256 Ma of 286 MPa.

The terpolymer had a polydispersity index of 3,3.

EXAMPLE 31

7 mg of catalyst C was mixed under inert conditions with 1 ml of a 10% wt solution of triethyl aluminium in n-heptane. An amount of 4 ml n-heptane were added and after two min, 1 g of a fine powder of a predried terpolymer obtained according to Example 28 was added to this catalyst system mixture and thoroughly mixed. The resultant polymer diluted catalyst slurry was introduced in a 1 l stainless steel gas phase reaction vessel provided with a combination of helical and vertical stirring, preheated to 80° C. 300 mg of hydrogen was introduced and the reaction vessel pressurized to 5 bar with nitrogen. 120 g of ethylene was fed to the reactor at a rate of 2 g/min and at the same time a 2:1 molar mixture of 1-pentene and 1-butene was fed at a rate of 0,4 g/min. After 60 min the feed of ethylene and the 1-pentene/1-butene mixture was stopped.

In a next step, the polymerization vessel was depressurized and the catalyst decomposed with propanol. The resultant copolymer was then filtered and repeatedly washed with propanol, methanol, acetone. The terpolymer was dried in a vacuum oven at 70° C. for 24 hours. The yield of the terpolymer was 90 g.

The amount of n-pentene incorporated in the terpolymer was 0,97%. The amount of n-butene incorporated in the terpolymer was 0,87%. The melt flow index of the terpolymer as measured according to ASTM D 1238 was 3. The density of the terpolymer as measured according to ASTM D1505 was 0,9267.

A sample of the terpolymer thus obtained was injection moulded according to ASTM D 647, had the following properties:
 (a) an Izod notched impact strength, as measured according to ASTM D 256, of 36,8 kJ/m$^2$.
 (b) a tensile strength at yield, as measured according to ASTM D 256 M, of 8,9 MPa
 (c) a modulus as measured according to ASTM D 256 M, of 278 MPa.

EXAMPLE 32

300 g of highly purified cyclohexane was introduced into a 1 l stainless steel polymerization vessel provided with agitation. After a thorough purging of the vessel with nitrogen the temperature was raised to 95° C. 2 ml of catalyst system B prepared according to Example 9 at constant activity time of 30 min was introduced into the vessel. The temperature was maintained at 95° C. and 150 mg of hydrogen introduced into the vessel and a simultaneous supply of 2 g/min of ethylene at constant flow, and a 1:3 mass mixture of n-butene-1 and n-pentene-1 at a flow rate of 4 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 95 g.

The amount of n-pentene incorporated in the terpolymer was 2%. The amount of n-butene incorporated in the terpolymer was 1%. The melt flow index of the terpolymer as measured according to ASTM D 1238 was 13,8. The density of the terpolymer as measured according to ASTM D1505 was 0,9211.

A sample of the terpolymer thus obtained was injection moulded according to ASTM D 647, had the following properties:
 (a) an Izod notched impact strength, as measured according to ASTM D 256, of 29,6 kJ/m$^2$.
 (b) a tensile strength at yield, as measured according to ASTM D 256 M, of 5,9 MPa
 (c) a modulus as measured according to ASTM D 256 M, of 180 MPa.

The terpolymer had a polydispersity index of 5,4.

EXAMPLE 33

300 g of highly purified cyclohexane was introduced into a 1 l stainless steel polymerization vessel provided with agitation. After a thorough purging of the vessel with nitrogen the temperature was raised to 95° C. 2 ml of catalyst system B prepared according to Example 9 at optimum activity time of 7,5 min was introduced into the vessel. The temperature was maintained at 95° C. and 100 mg of hydrogen introduced into the vessel and a simultaneous supply of 2 g/min of ethylene at constant flow, and a 1:1 mass mixture of n-butene-1 and n-pentene-1 at a flow rate of 4 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 100 g.

The amount of n-pentene incorporated in the terpolymer was 2%. The amount of n-butene incorporated in the terpolymer was 2,5%. The melt flow index of the terpolymer as measured according to ASTM D 1238 was 6. The density of the terpolymer as measured according to ASTM D1505 was 0,9211.

A sample of the terpolymer thus obtained was injection moulded according to ASTM D 647, had the following properties:
 (a) an Izod notched impact strength, as measured according to ASTM D 256, of 27,4 kJ/m$^2$.
 (b) a tensile strength at yield, as measured according to ASTM D 256 M, of 7,2 MPa
 (c) a modulus as measured according to ASTM D 256 M, of 164 MPa.

EXAMPLE 34

300 g of highly purified cyclohexane was introduced into a 1 l stainless steel polymerization vessel provided with agitation. 5 ml of a 10% solution of triethyl aluminium in n-heptane was added after a thorough purging of the vessel with nitrogen. The temperature was raised to 95° C. 0,5 ml of catalyst C was introduced into the vessel. The temperature was maintained at 95° C. and 200 mg of hydrogen introduced into the vessel and a simultaneous supply of 2 g/min of ethylene at constant flow, and a 3:1 mass mixture of n-butene-1 and n-pentene-1 at a flow rate of 4 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 101 g.

The amount of n-pentene incorporated in the terpolymer was 0,35%. The amount of n-butene incorporated in the terpolymer was 3,4%. The melt flow index of the terpolymer as measured according to ASTM D 1238 was 12. The density of the terpolymer as measured according to ASTM D1505 was 0,9192.

A sample of the terpolymer thus obtained was injection moulded according to ASTM D 647, had the following properties:

(a) an Izod notched impact strength, as measured according to ASTM D 256, of 25,0 kJ/m².
(b) a tensile strength at yield, as measured according to ASTM D 256 M, of 5,7 MPa
(c) a modulus as measured according to ASTM D 256 M, of 141 MPa.

EXAMPLE 35

300 g of highly purified cyclohexane was introduced into a 1 l stainless steel polymerization vessel provided with agitation. After a thorough purging of the vessel with nitrogen the temperature was raised to 95° C. 2 ml of catalyst system F prepared according to Example 11 at constant activity time of 30 min was introduced into the vessel. The temperature was raised to 105° C. and 150 mg of hydrogen introduced into the vessel and a simultaneous supply of 2 g/min of ethylene at constant flow, and a 1:1 mass mixture of n-octene-1 and n-pentene-1 at a flow rate of 4 g/min, was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 104 g.

The amount of n-pentene incorporated in the terpolymer was 3,8%. The amount of n-octene incorporated in the terpolymer was 1,4%. The melt flow index of the terpolymer as measured according to ASTM D 1238 was 10. The density of the terpolymer as measured according to ASTM D1505 was 0,9149.

A sample of the terpolymer thus obtained was injection moulded according to ASTM D 647, had the following properties:
(a) an Izod notched impact strength, as measured according to ASTM D 256, of 35,0 kJ/m².
(b) a tensile strength at yield, as measured according to ASTM D 256 M, of 7,5 MPa
(c) a modulus as measured according to ASTM D 256 M, of 234 MPa.

EXAMPLE 36

300 g of highly purified cyclohexane was introduced into a 1 l stainless steel polymerization vessel provided with agitation. After a thorough purging of the vessel with nitrogen the temperature was raised to 95° C. 2 ml of catalyst system F prepared according to Example 11 at optimum activity time of 8,5 min was introduced into the vessel. The temperature was maintained at 95° C. and 75 mg of hydrogen introduced into the vessel and a simultaneous supply of 2 g/min of ethylene at constant flow, and a 2:1 mass mixture of n-octene and n-pentene-1 at a flow rate of 4 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 90 g.

The amount of n-pentene incorporated in the terpolymer was 1,9%. The amount of n-octene incorporated in the terpolymer was 1,8%. The melt flow index of the terpolymer as measured according to ASTM D 1238 was 2,6. The density of the terpolymer as measured according to ASTM D1505 was 0,9144.

A sample of the terpolymer thus obtained was injection moulded according to ASTM D 647, had the following properties:
(a) an Izod notched impact strength, as measured according to ASTM D 256, of 38,9 kJ/m².
(b) a tensile strength at yield, as measured according to ASTM D 256 M, of 7,6 MPa
(c) a modulus as measured according to ASTM D 256 M, of 241 MPa.

EXAMPLE 37

300 g of highly purified cyclohexane was introduced into a 1 l stainless steel polymerization vessel provided with agitation. 5 ml of a 10% solution of triethyl aluminium in n-heptane was added after a thorough purging of the vessel with nitrogen. The temperature was raised to 95° C. 0,5 ml of catalyst G was introduced into the vessel. The temperature was increased to 105° C. and 150 mg of hydrogen introduced into the vessel and a simultaneous supply of 2 g/min of ethylene at constant flow, and a 7:1 mass mixture of n-octene-1 and n-pentene-1 at a flow rate of 4 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 77 g.

The amount of n-pentene incorporated in the terpolymer was 0,3%. The amount of n-octene incorporated in the terpolymer was 1,6%. The melt flow index of the terpolymer as measured according to ASIM D 1238 was 9,5. The density of the terpolymer as measured according to ASTM D1505 was 0,9193.

A sample of the terpolymer thus obtained was injection moulded according to ASTM D 647, had the following properties:
(a) an Izod notched impact strength, as measured according to ASTM D 256, of 42,2 kJ/m².
(b) a tensile strength at yield, as measured according to ASTM D 256 M, of 9,0 MPa
(c) a modulus as measured according to ASTM D 256 M, of 270 MPa.

EXAMPLE 38

300 g of highly purified cyclohexane was introduced into a 1 l stainless steel polymerization vessel provided with agitation. After a thorough purging of the vessel with nitrogen the temperature was raised to 95° C. 2 ml of catalyst system H prepared according to Example 10 at constant activity time of 30 min was introduced into the vessel. The temperature was maintained at 95° C. and 450 mg of hydrogen introduced into the vessel and a simultaneous supply of 2 g/min of ethylene at constant flow, and a 1:1 mass mixture of n-hexene and n-pentene-1 at a flow rate of 0,8 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 83 g.

The amount of n-pentene incorporated in the terpolymer was 0,45%. The amount of n-hexene incorporated in the terpolymer was 0,35. The melt flow index of the terpolymer as measured according to ASTM D 1238 was 2,9. The density of the terpolymer as measured according to ASTM D1505 was 0, 9866.

A sample of the terpolymer thus obtained was injection moulded according to ASTM D 647, had the following properties:
(a) an Izod notched impact strength, as measured according to ASTM D 256, of 6,63 kJ/m².
(b) a tensile strength at yield, as measured according to ASTM D 256 M, of 18,87 MPa
(c) a modulus as measured according to ASTM D 256 M, of 742 MPa.

EXAMPLE 39

300 g of highly purified cyclohexane was introduced into a 1 l stainless steel polymerization vessel provided with agitation. After a thorough purging of the vessel with nitrogen the temperature was raised to 95° C. 2 ml of catalyst system H prepared according to Example 10 at optimum activity time of 7 min was introduced into the vessel. The temperature was maintained at 95° C. and 450 mg of hydrogen introduced into the vessel and a simultaneous supply of 2 g/min of ethylene at constant flow, and a 1:1 mass mixture of n-hexene-1 and n-pentene-1 at a flow rate of 1 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 77 g.

The amount of n-pentene incorporated in the terpolymer was 0,55%. The amount of n-hexene incorporated in the terpolymer was 0,45%. The melt flow index of the terpolymer as measured according to ASTM D 1238 was 3,4. The density of the terpolymer as measured according to ASTM D1505 was 0,9471. The polydispersity index of the terpolymer measured against polystyrene standards was 4,2.

A sample of the terpolymer thus obtained was injection moulded according to ASTM D 647, had the following properties:
(a) an Izod notched impact strength, as measured according to ASTM D 256, of 7,8 kJ/m².
(b) a tensile strength at yield, as measured according to ASTM D 256 M, of 20,4 MPa
(c) a modulus as measured according to ASTM D 256 M, of 674 MPa.

EXAMPLE 40

300 g of highly purified cyclohexane was introduced into a 1 l stainless steel polymerization vessel provided with agitation. 5 ml of a 10% solution of triethyl aluminium in n-heptane was added after a thorough purging of the vessel with nitrogen. The temperature was raised to 95° C. 0,5 ml of catalyst H was introduced into the vessel. The temperature was maintained at 95° C. and 450 mg of hydrogen introduced into the vessel and a simultaneous supply of 2 g/min of ethylene at constant flow, and a 1:1 mass mixture of n-hexene-1 and n-pentene-1 at a flow rate of 0,6 g/min was commenced. The reaction was continued for 50 min.

In a next step, the polymerization vessel was depressurized and the catalyst decomposed with propanol. The resultant copolymer was then filtered and repeatedly washed with propanol, methanol, and acetone. The terpolymer was dried in a vacuum oven at 70° C. for 24 hours. The yield of the terpolymer was 88 g.

The amount of n-pentene incorporated in the terpolymer was 0,35%. The amount of n-hexene incorporated in the terpolymer was 0,25%. The melt flow index of the terpolymer as measured according to ASTM D 1238 was 7,7. The density of the terpolymer as measured according to ASTM D1505 was 0,9489.

A sample of the terpolymer thus obtained was injection moulded according to ASTM D 647, had the following properties:
(a) an Izod notched impact strength, as measured according to ASTM D 256, of 5,0 kJ/m².
(b) a tensile strength at yield, as measured according to ASTM D 256 M, of 23,2 MPa
(c) a modulus as measured according to ASTM D 256 M, of 843 MPa.

EXAMPLE 41

2000 g of highly purified toluene was introduced into a 10 l stainless steel polymerization vessel provided with agitation. After a thorough purging of the vessel with nitrogen, 100 ml of methyl alumoxane was introduced into the vessel and thoroughly mixed. 0,05 ml of a toluene solution of (n-BuCp)$_2$ZrCl$_2$ with a concentration of 0,0166 g/ml were introduced and the temperature was increased to 85° C. under stirring. After 5 minutes, a simultaneous supply of an amount of 722 g of ethylene at a constant flow of 15 g/min, and a 2:1 mass mixture of n-pentene-1/n-hexene-1 at a flow rate of 3 g/min was commenced. After the introduction of the monomers had been completed, the reaction was continued for 30 min.

In a next step the polymerization vessel was depressurized and the catalyst decomposed with propanol. The resultant terpolymer was then filtered and repeatedly washed with propanol, methanol, acetone. The terpolymer was dried in a vacuum oven at 70° C. for 24 hours. The yield of the terpolymer was 630 g.

The amount of n-pentene incorporated in the terpolymer was 0,19%. The amount of n-hexene incorporated in the terpolymer was 0,16%. The melt flow index of the terpolymer as measured according to ASTM D 1238 was 1,1. The density of the terpolymer as measured according to ASTM D1505 was 0,9472.

A bottom fed blown film of 30 microns was obtained from the terpolymer on a 31,75 mm extruder at 210° C. melt temperature and a take off speed of 4,2 m/min.

The impact strength, as measured according to ASTM D 1709, was 65 g.

The tensile strength at yield, as measured according to ASTM D 882 was 7,14 MPa in the machine direction (MD) and 8,04 MPa in the transverse direction.

EXAMPLE 42

2000 g of highly purified toluene was introduced into a 10 l stainless steel polymerization vessel provided with agitation. After a thorough purging of the vessel with nitrogen, 400 ml of ethyl alumoxane was introduced into the vessel and thoroughly mixed. 0,05 ml of a toluene solution of (n-BuCP)$_2$ZrCl$_2$ with a concentration of 0,0166 g/ml were introduced and the temperature was increased to 85° C. under stirring. After 5 minutes, a simultaneous supply of an amount of 800 g of ethylene at a constant flow of 15 g/min, and a 10:1 mass mixture of n-pentene-1/1-hexene-1 at a feed rate of 3 g/min was commenced. After the introduction of the monomers had been completed, the reaction was continued for 30 min.

In a next step the polymerization vessel was depressurized and the catalyst decomposed with propanol. The resultant terpolymer was then filtered and repeatedly washed with propanol, methanol, acetone. The terpolymer was dried in a vacuum oven at 70° C. for 24 hours. The yield of the terpolymer was 630 g.

The amount of n-pentene incorporated in the terpolymer was 2%. The amount of n-hexene incorporated in the terpolymer was 0,2%. The melt flow index of the terpolymer as measured according to ASTM D 1238 was 33. The density of the terpolymer as measured according to ASTM D1505 was 0,92411.

A sample of the terpolymer thus obtained was injection moulded according to ASTM D 647, had the following properties:

(a) an Izod notched impact strength, as measured according to ASTM D 256, of 42,6 kJ/m².

(b) a tensile strength at yield, as measured according to ASTM D 256 M, of 11,4 MPa (c) a modulus as measured according to ASTM D 256 M, of 340 MPa.

The terpolymer had a polydispersity index of 2,4.

EXAMPLE 43

2000 g of highly purified toluene was introduced into a 10 l stainless steel polymerization vessel provided with agitation. After a thorough purging of the vessel with nitrogen, 100 ml of methyl alumoxane was introduced into the vessel and thoroughly mixed. 0,05 ml of toluene solution of (n-BuCp)$_2$ZrCl$_2$ with a concentration of 0,0166 g/ml were introduced and the temperature was increased to 85° C. under stirring. After 5 minutes, a simultaneous supply of an amount of 700 g of ethylene at a constant flow of 15 g/min, and a 1:1 mass mixture of n-pentene-1/1-hexene-1 at a feed rate of 3 g/min, was commenced. After the introduction of the monomers had been completed, the reaction was continued for 30 min.

In a next step the polymerization vessel was depressurized and the catalyst decomposed with propanol. The resultant terpolymer was then filtered and repeatedly washed with propanol, methanol, acetone. The terpolymer was dried in a vacuum oven at 70° C. for 24 hours. The yield of the terpolymer was 630 g.

The amount of n-pentene incorporated in the terpolymer was 0,16%. The amount of n-hexene incorporated in the terpolymer was 0,11%. The melt flow index of the terpolymer as measured according to ASTM D 1238 was 1. The density of the terpolymer as measured according to ASTM D1505 was 0,9497.

A sample of the terpolymer thus obtained was injection moulded according to ASTM D 647, had the following properties:

(a) an Izod notched impact strength, as measured according to ASTM D 256, of 31,1 kJ/m².

(b) a tensile strength at yield, as measured according to ASTM D 256 M, of 25,3 MPa (c) a modulus as measured according to ASTM D 256 M, of 713 MPa.

The terpolymer had a polydispersity index of 2,6.

EXAMPLE 44

Example 43 was repeated, with the following differences:

A feed rate of 4,5 g/min of the 2:1 1/pentene/1-hexene mixture was used. The yield of the terpolymer was 600 g.

The amount of n-pentene incorporated in the terpolymer was 0,25%. The amount of n-hexene incorporated in the terpolymer was 0,16%. The melt flow index of the terpolymer as measured according to ASTM D 1238 was 0,9. The density of the terpolymer as measured according to ASTM D1505 was 0,9430.

A sample of the terpolymer thus obtained was injection moulded according to ASTM D 647, had the following properties:

(a) an Izod notched impact strength, as measured according to ASTM D 256, of 20,6 kJ/m².

(b) a tensile strength at yield, as measured according to ASTM D 256 M, of 24,9 MPa (c) a modulus as measured according to ASTM D 256 M, of 672 MPa.

EXAMPLE 45

Example 43 was repeated, with the following differences:

900 g of ethylene were introduced at 15 g/min and a feed rate of 10 g/min of the 1:1 1-pentene/1-hexene mixture was used. The yield of terpolymer was 810 g.

The amount of n-pentene incorporated in the terpolymer was 0,3%. The amount of n-hexene incorporated in the terpolymer was 0,4% The melt flow index of the terpolymer as measured according to ASTM D 1238 was 1,2. The density of the terpolymer as measured according to ASTM D1505 was 0,9386.

A sample of the terpolymer thus obtained was injection moulded according to ASTM D 647, had the following properties:

(a) an Izod notched impact strength, as measured according to ASTM D 256, of 43,7 kJ/m².

(b) a tensile strength at yield, as measured according to ASTM D 256 M, of 19,4 MPa (c) a modulus as measured according to ASTM D 256 M, of 639 MPa.

EXAMPLE 46

Example 43 was repeated, with the following differences:

1000 g of ethylene were introduced at 15 g/min and the feed rate of the 2:3 of 1/pentene/1-hexene mixture was 6 g/min. 400 ml EAO were used instead of 100 ml MAO. The yield of terpolymer was 680 g.

The amount of n-pentene incorporated in the terpolymer was 0,35%. The amount of n-hexene incorporated in the terpolymer was 0,55%. The melt flow index of the terpolymer as measured according to ASTM D 1238 was 2,9. The density of the terpolymer as measured according to ASTM D1505 was 0,9359.

A sample of the terpolymer thus obtained was injection moulded according to ASTM D 647, had the following properties:

(a) an Izod notched impact strength, as measured according to ASTM D 256, of 49,2 kJ/m².

(b) a tensile strength at yield, as measured according to ASTM D 256 M, of 17,3 MPa (c) a modulus as measured according to ASTM D 256 M, of 496 MPa.

EXAMPLE 47

350 ml of highly purified cyclohexane was added to a 1 l stainless steel reaction vessel provided with agitation and heated to 60° C. Under inert conditions, 0,1 mg of (n-BuCp)$_2$ZrCl$_2$ was reacted with 10 ml of a 30% solution of MAO in toluene and the reaction mixture transferred to the reactor in a gas tight syringe. Ethylene flow at a rate of 2 g/min and a 3:1 wt ratio of 1-pentene/1-butene at a rate of 2 g/min was started simultaneously. After 50 min the flow of ethylene and the mixture of 1-pentene/1-hexene was stopped and the reaction mixture cooled down to room temperature.

In a next step the polymerization vessel was depressurized and the catalyst decomposed with propanol. The resultant terpolymer was then filtered and repeatedly washed with propanol, methanol, acetone. The terpolymer was dried in a vacuum oven at 70° C. for 24 hours. The yield of the terpolymer was 80 g.

The melt flow index of the terpolymer as measured according to ASTM D 1238 was 0,1. The density of the terpolymer as measured according to ASTM D1505 was 0,9159.

A sample of the terpolymer thus obtained was injection moulded according to ASTM D 647, had the following properties:
  (a) an Izod notched impact strength, as measured according to ASTM D 256, of 44,4 kJ/m$^2$.
  (b) a tensile strength at yield, as measured according to ASTM D 256 M, of 12,9 MPa
  (c) a modulus as measured according to ASTM D 256 M, of 281 MPa.

EXAMPLE 48

350 ml of highly purified cyclohexane was added to a 1 l stainless steel reaction vessel provided with agitation and heated to 60° C. Under inert conditions, 0,1 mg of (n-BuCp)$_2$ZrCl$_2$ was reacted with 10 ml of a 30% solution of MAO in toluene and the reaction mixture transferred to the reactor in a gas tight syringe. Ethylene flow at a rate of 2 g/min and a 1:2 wt ratio of 1-pentene/1-octene at a rate of 1,5 g/min was started simultaneously. After 50 min the flow of ethylene and the mixture of 1-pentene/1-octene was stopped and the reaction mixture cooled down to room temperature.

In a next step the polymerization vessel was depressurized and the catalyst decomposed with propanol. The resultant terpolymer was then filtered and repeatedly washed with propanol, methanol, acetone. The terpolymer was dried in a vacuum oven at 70° C. for 24 hours. The yield of the terpolymer was 70 g.

The melt flow index of the terpolymer as measured according to ASTM D 1238 was 7. The density of the terpolymer as measured according to ASTM D1505 was 0,9191.

A sample of the terpolymer thus obtained was injection moulded according to ASTM D 647, had the following properties:
  (a) an Izod notched impact strength, as measured according to ASTM D 256, of 52,3 kJ/m$^2$.
  (b) a tensile strength at yield, as measured according to ASTM D 256 M, of 13,6 MPa
  (c) a modulus as measured according to ASTM D 256 M, of 416 MPa.

What is claimed is:

1. A terpolymer of ethylene, 1-pentene and a further alpha olefin ("α-olefin") which has a total number of carbon atoms greater than 6 and less than 10.

2. A terpolymer which comprises a polymerization product obtained by polymerizing at least ethylene, 1-pentene and a further alpha olefin ("α-olefin") which has a total number of carbon atoms greater than 6 and less than 10.

3. A terpolymer according to claim 1, wherein the further α-olefin is 1-octene.

4. A terpolymer according to claim 3, wherein the molar ratio of ethylene to the sum of 1-pentene and the further α-olefin is between 99,9:0,1 and 90:10, while the molar ratio of 1-pentene to that of the further α-olefin is between 0,01:99,99 and 99,99:0,01, and which has a melt flow rate, as measured according to ASTM D 1238, in the range 0,01 to 100 g/10 min, and/or has a density, as measured according to ASTM D 1505, in the range of 0,89 to 0,959/cm$^3$.

5. A terpolymer according to claim 3, which is such that when it is bottom blown into a film having a thickness of 30 μ, the film complies with the following requisites;
  (i) An impact strength, as measured according to ASTM D 1709, of greater than 60 g; and/or
  (ii) A tear strength, as measured according to ASTM 1922, of greater than 2,3 g/μm in the machine direction (MD) and greater that 11 g/μm in the transverse direction (TD).

6. A terpolymer according to claim 3, which is that when it is injection moulded according to ASTM D 647, it complies with the following requisites:
  (a) an Izod notched impact strength, as measured according to ASTM D 256, of between 5 and 50 kJ/m$^2$;
  (b) a tensile strength at yield, as measured according to ASTM D 256 M, of between 7,5 and 15 MPa; and
  (c) a modulus as measured according to ASTM D 256 M, of between 150 and 600 MPa.

7. A terpolymer of ethylene, 1-pentene and a further alpha olefin ("α-olefin") which, as regards its total number of carbon atoms, differs by 1 unit from 1-pentene and has more carbon atoms than 1-pentene, which has a polydispersity index smaller than 3, and which, when injection moulded according to ASTM D 647, complies with the following requisites:
  (a) a melt flow rate, as measured according to ASTM D 1238, in the range of about 0,01 to about 100 g/10 min; and/or
  (b) a density as measured according to ASTM D 1505, in the range of 0,890 to about 0,950;
  (c) an Izod notched impact strength, as measured according to ASTM D 256, of between 5 and 65 kJ/ m$^2$;
  (d) a tensile strength at yield, as measured according to ASTM D 256 M, of between 9 and 25 MPa; and
  (e) a modulus, as measured according to ASTM D 256 M, of between than 200 and 1000 MPa.

8. A process for producing a terpolymer, which process comprises reacting a reaction mixture comprising ethylene, 1-pentene and a further α-olefin which has a total number of carbon atoms greater than 6 and less than 10, in one or more reaction zones, while maintaining the reaction zone(s) at a pressure between atmospheric pressure and 200 kg/cm$^2$, and at a temperature between ambient and 300° C., in the presence of a catalyst or a catalyst system comprising a catalyst and a cocatalyst, with the reaction being effected in a slurry phase, a gas phase or a solution phase.

9. A process according to claim 8, which is effected in the slurry phase, with the slurry phase comprising the catalyst in solid particulate form and a hydrocarbon liquid as a slurrying agent for the catalyst, and wherein the catalyst is that obtained by mixing an ether having a total number of carbon equal or higher than 8, with a partially anhydrised magnesium chloride having a water content of 0,02 mole to 2 mole of water per 1 mole of magnesium chloride, to produce partially activated magnesium chloride;

adding, dropwise, an alkyl-aluminium compound to the partially activated magnesium chloride to obtain unwashed activated magnesium chloride;

washing the activated magnesium chloride with an inert hydrocarbon liquid to obtain an activated magnesium-chloride containing slurry;

mixing a plurality of alcohols with the activated magnesium chloride-containing slurry, to obtain an activated support/alcohol complex; and mixing titanium tetrachloride with the activated support/alcohol complex, to form the catalyst which is thus a magnesium chloride supported titanium catalyst, with the further α-olefin being 1-octene, and with the resultant terpolymer complying with the following properties;

(a) when it is bottom blown into a film having a thickness of 30 μ, the film complies with the following requisites:
  (i) An impact strength, as measured according to ASTM D 1709, of greater than 60 g; and/or
  (ii) A tear strength, as measured according to ASTM 1922, of greater than 2,3 g/μm in the machine direction (MD) and greater than 11 g/μm in the transverse direction (TD); and/or
(b) when it is injection moulded according to ASTM D 647, it complies with the following requisites:
  (i) an Izod notched impact strength, as measured according to ASTM D 256, of between 5 and 50 kJ/m$^2$;
  (ii) a tensile strength at yield, as measured according to ASTM D 256 M, of between 7,5 and 15 MPa; and
  (iii) a modulus as measured according to ASTM D 256 M, of between 150 and 600 MPa.

10. A process according to claim 8, which is effected in the gas phase, and wherein the catalyst is a prepolymerized catalyst in solid particulate form obtained by mixing an ether having a total number of carbon atoms equal to or greater than 8, with a partially anhydrised magnesium chloride with a water content of 0,02 mole to 2 mole of water per 1 mole of magnesium chloride, to produce a partially activated magnesium chloride;

adding, dropwise, an alkyl aluminium compound to the partially activated magnesium chloride to obtain unwashed activated magnesium chloride;

washing the activated magnesium chloride with an inert hydrocarbon liquid to obtain an activated magnesium chloride-containing slurry;

mixing a plurality of alcohols with the activated magnesium chloride-containing slurry to obtain an activated support/alcohol complex;

mixing titanium tetrachloride with the activated support/alcohol complex, to form a catalyst which is a magnesium chloride supported titanium catalysts; and contacting the catalyst with at least one prepolymerization α-olefin, so that the α-olefin polymerizes, thereby to form the prepolymerized catalyst.

11. A process according to claim 8, which is effected in the gas phase, and wherein the catalyst is a polymer diluted catalyst obtained by mixing a) a catalyst component obtained by
  mixing an ether having a total number of carbon atoms equal to or greater than 8, with a partially anhydrised magnesium chloride having a water content of 0,02 mole to 2 mole of water per 1 mole of magnesium chloride, to produce a partially activated magnesium chloride;
  adding, dropwise, an alkyl aluminium compound to the partially activated magnesium chloride to obtain unwashed activated magnesium chloride;
  washing the activated magnesium chloride with an inert hydrocarbon liquid to obtain an activated magnesium chloride containing slurry;
  mixing a plurality of alcohols with the activated magnesium chloride-containing slurry to obtain an activated support/alcohol complex; and
  mixing titanium tetrachloride with the activated support/alcohol complex, to form the catalyst component; and
b) a polymer component which dilutes the catalyst compound, with the polymer component being an ethylene polymer which is in powder form and which is inactive to the catalyst component.

12. A process according to claim 8, which is effected in the solution phase wherein the terpolymer which is formed is dissolved in a liquid reaction medium in which the catalyst is insoluble, with the catalyst being that obtained by mixing an ether having a total number of carbon atoms equal to or greater than 8, with a partially anhydrised magnesium chloride having a water content of 0,02 mole to 2 mole of water per 1 mole of magnesium chloride, to produce a partially activated magnesium chloride;

adding, dropwise, an alkyl aluminum compound to the partially activated magnesium chloride to obtain unwashed activated magnesium chloride;

washing the activated magnesium chloride with an inert hydrocarbon liquid to obtain an activated magnesium chloride-containing slurry;

mixing a plurality of alcohols with the activated magnesium chloride-containing slurry to obtain an activated support/alcohol complex; and mixing titanium tetrachloride with the activated support/alcohol complex, to form a catalyst which is a magnesium chloride supported titanium catalyst, with the terpolymerization being effected at a temperature which is above the temperature at which the terpolymer becomes completely soluble in the reaction medium.

13. A process according to claim 8, wherein the catalyst is a metallocene catalyst.

14. A process for producing a terpolymer which process comprises reacting a reaction mixture comprising an ethylene, 1-pentene, and a further α-olefin which, as regards its total number of carbon atoms, differs by 1 unit from 1-pentene and has more carbon atoms than 1-pentene, in one or more reaction zones, while maintaining the reaction zone(s) at a pressure between atmospheric pressure and 200 kg/cm$^2$, and at a temperature between ambient and 300° C. in the presence of a catalyst or a catalyst system comprising a catalyst and a cocatalyst, with the reaction being effected in a gas phase or a solution phase.

15. A process according to claim 14, which is effected in the gas phase, and wherein the catalyst is a prepolymerized catalyst in solid particulate form obtained by mixing an ether having a total number of carbon atoms equal to or greater than 8, with a partially anhydrised magnesium chloride with a water content of 0,02 mole to 2 mole of water per 1 mole of magnesium chloride, to produce a partially activated magnesium chloride;

adding, dropwise, an alkyl aluminium compound to the partially activated magnesium chloride to obtain unwashed activated magnesium chloride;

washing the activated magnesium chloride with an inert hydrocarbon liquid to obtain an activated magnesium chloride-containing slurry;

mixing a plurality of alcohols with the activated magnesium chloride-containing slurry to obtain an activated support/alcohol complex;

mixing titanium tetrachloride with the activated support/alcohol complex, to form a catalyst which is a magnesium chloride supported titanium catalysts; and contacting the catalyst with at least one prepolymerization α-olefin, so that the α-olefin polymerizes, thereby to form the prepolymerized catalyst.

16. A process according to claim 14, which is effected in the gas phase, and wherein the catalyst is a polymer diluted catalyst obtained by mixing a) a catalyst component obtained by mixing an ether having a total number of carbon atoms equal to or greater than 8, with a partially anhydrised magnesium chloride having a water content of 0,02 mole to 2 mole of water per 1 mole of magnesium chloride, to produce a partially activated magnesium chloride;

adding, dropwise, an alkyl aluminium compound to the partially activated magnesium chloride to obtain unwashed activated magnesium chloride;

washing the activated magnesium chloride with an inert hydrocarbon liquid to obtain an activated magnesium chloride containing slurry;

mixing a plurality of alcohols with the activated magnesium chloride-containing slurry to obtain an activated support/alcohol complex; and mixing titanium tetrachloride with the activated support/alcohol complex, to form the catalyst component; and b) a polymer component which dilutes the catalyst compound, with the polymer component being an ethylene polymer which is in powder form and which is inactive to the catalyst component.

17. A process according to claim 14, which is effected in the solution phase wherein the terpolymer which is formed is dissolved in a liquid reaction medium in which the catalyst is insoluble, with the catalyst being that obtained by mixing an ether having a total number of carbon atoms equal to or greater than 8, with a partially anhydrised magnesium chloride having a water content of 0,02 mole to 2 mole of water per 1 mole of magnesium chloride, to produce a partially activated magnesium chloride;

adding, dropwise, an alkyl aluminum compound to the partially activated magnesium chloride to obtain unwashed activated magnesium chloride;

washing the activated magnesium chloride with an inert hydrocarbon liquid to obtain an activated magnesium chloride-containing slurry;

mixing a plurality of alcohols with the activated magnesium chloride-containing slurry to obtain an activated support/alcohol complex; and mixing titanium tetrachloride with the activated support/alcohol complex, to form a catalyst which is a magnesium chloride supported titanium catalyst, with the terpolymerization being effected at a temperature which is above the temperature at which the terpolymer becomes completely soluble in the reaction medium.

18. A process according to claim 14, wherein the catalyst is a metallocene catalyst.

* * * * *